United States Patent
Mosko

(10) Patent No.: US 12,223,074 B2
(45) Date of Patent: Feb. 11, 2025

(54) SYSTEM AND METHOD FOR SECURING WINDOWS DISCRETIONARY ACCESS CONTROL

(71) Applicant: Palo Alto Research Center Incorporated, Palo Alto, CA (US)

(72) Inventor: Marc E. Mosko, Kensington, CA (US)

(73) Assignee: Xerox Corporation, Norwalk, CT (US)

( * ) Notice: Subject to any disclaimer, the term of this patent is extended or adjusted under 35 U.S.C. 154(b) by 246 days.

(21) Appl. No.: 17/900,458

(22) Filed: Aug. 31, 2022

(65) Prior Publication Data

US 2023/0161892 A1     May 25, 2023

Related U.S. Application Data

(60) Provisional application No. 63/245,349, filed on Sep. 17, 2021.

(51) Int. Cl.
    *G06F 21/62*         (2013.01)
    *G06F 21/45*         (2013.01)

(52) U.S. Cl.
    CPC .......... *G06F 21/6218* (2013.01); *G06F 21/45* (2013.01); *G06F 2221/2141* (2013.01)

(58) Field of Classification Search
    CPC ................. G06F 21/6218; G06F 21/45; G06F 2221/2141; G06F 21/604
    See application file for complete search history.

(56) References Cited

U.S. PATENT DOCUMENTS

| | | | |
|---|---|---|---|
| 6,742,128 B1 | 5/2004 | Joiner | |
| 7,013,395 B1 | 3/2006 | Swiler | |
| 7,627,900 B1 | 12/2009 | Noel | |
| 8,087,065 B2 * | 12/2011 | Tirosh | G06F 21/62 713/192 |
| 9,215,158 B1 | 12/2015 | Adogla | |

(Continued)

FOREIGN PATENT DOCUMENTS

| | | |
|---|---|---|
| CN | 106991325 A | 7/2017 |
| CN | 106997437 A | 8/2017 |

(Continued)

OTHER PUBLICATIONS

Albanese, M., & Jajodia, S. (2017). A Graphical Model to Assess the Impact of Multi-Step Attacks. The Journal of Defense Modeling and Simulation. 79-93.

(Continued)

*Primary Examiner* — Baotran N To

(57) ABSTRACT

A system and method are provided to facilitate securing windows discretionary access control. During operation, the system determines a Windows domain model including capability assignments of principals on resources, wherein a respective capability assignment comprises a permission of a respective principal to a respective resource and wherein a respective principal comprises a user or a group of users. The system specifies desired effective permissions of each principal to each resource. The system generates, based on the specified desired effective permissions, access control entries for the respective principal to the respective resource. The system generates, based on the specified desired effective permissions, group memberships indicating which users belong to which groups.

20 Claims, 15 Drawing Sheets

(56) References Cited

U.S. PATENT DOCUMENTS

| | | | |
|---|---|---|---|
| 9,317,692 B2 | 4/2016 | Elder | |
| 9,684,865 B1 | 6/2017 | Ezick | |
| 9,705,978 B1 | 7/2017 | Kenigsberg | |
| 9,736,173 B2 | 8/2017 | Li | |
| 10,122,757 B1* | 11/2018 | Kruse | H04L 63/10 |
| 10,313,382 B2 | 6/2019 | Noel | |
| RE47,757 E | 12/2019 | Hering | |
| 10,516,761 B1 | 12/2019 | A | |
| 10,601,854 B2 | 3/2020 | Lokamathe | |
| 10,771,489 B1 | 9/2020 | Bisht | |
| 10,812,499 B2 | 10/2020 | Hassanzadeh | |
| 10,904,270 B2 | 1/2021 | Muddu | |
| 11,265,292 B1 | 3/2022 | Leviseur | |
| 2006/0265324 A1 | 11/2006 | Leclerc | |
| 2007/0011319 A1 | 1/2007 | McClure | |
| 2007/0283443 A1* | 12/2007 | McPherson | G06F 21/6218 726/28 |
| 2008/0098479 A1 | 4/2008 | O'Rourke | |
| 2008/0104665 A1 | 5/2008 | Naldurg | |
| 2008/0172716 A1 | 7/2008 | Talpade | |
| 2009/0077666 A1 | 3/2009 | Chen | |
| 2009/0265199 A1 | 10/2009 | Moerdler | |
| 2010/0095381 A1 | 4/2010 | Levi | |
| 2010/0192195 A1 | 7/2010 | Dunagan | |
| 2011/0296523 A1* | 12/2011 | Schechter | G06F 21/6218 726/21 |
| 2013/0232331 A1 | 9/2013 | Farhan | |
| 2013/0247205 A1 | 9/2013 | Schrecker | |
| 2013/0283350 A1* | 10/2013 | Afek | G06F 21/6218 726/4 |
| 2015/0058993 A1 | 2/2015 | Choi | |
| 2015/0244734 A1 | 8/2015 | Olson | |
| 2016/0050116 A1 | 2/2016 | Sheshadri | |
| 2016/0205122 A1 | 7/2016 | Bassett | |
| 2017/0034023 A1 | 2/2017 | Nickolov | |
| 2017/0078320 A1 | 3/2017 | Hughes | |
| 2017/0177740 A1 | 6/2017 | Abaya | |
| 2017/0195349 A1 | 7/2017 | Shabtai | |
| 2017/0286690 A1 | 10/2017 | Chari | |
| 2017/0289187 A1 | 10/2017 | Noel | |
| 2017/0324768 A1 | 11/2017 | Crabtree | |
| 2018/0210927 A1 | 7/2018 | Karam | |
| 2018/0322407 A1 | 11/2018 | Baum | |
| 2019/0098039 A1 | 3/2019 | Gates | |
| 2019/0364051 A1* | 11/2019 | Ferrans | G06F 16/9024 |
| 2020/0053116 A1 | 2/2020 | Soroush | |
| 2020/0110774 A1 | 4/2020 | Lakshmanan | |
| 2020/0137104 A1 | 4/2020 | Hassanzadeh | |
| 2020/0167705 A1 | 5/2020 | Risoldi | |
| 2020/0175174 A1 | 6/2020 | Bakalli | |
| 2020/0177608 A1 | 6/2020 | Okunlola | |
| 2020/0177615 A1 | 6/2020 | Grabois | |
| 2020/0177617 A1 | 6/2020 | Hadar | |
| 2020/0177618 A1 | 6/2020 | Hassanzadeh | |
| 2020/0244691 A1 | 7/2020 | Veeramany | |
| 2020/0311630 A1 | 10/2020 | Risoldi | |
| 2020/0412758 A1 | 12/2020 | Trivellato | |
| 2021/0012012 A1 | 1/2021 | Soroush | |
| 2021/0014065 A1 | 1/2021 | Gourisetti | |
| 2021/0014264 A1 | 1/2021 | Soroush | |
| 2021/0014265 A1 | 1/2021 | Hadar | |
| 2021/0409439 A1 | 12/2021 | Engelberg | |
| 2022/0014534 A1 | 1/2022 | Basovskiy | |
| 2022/0191230 A1 | 6/2022 | Morgan | |
| 2022/0263860 A1 | 8/2022 | Crabtree | |
| 2022/0286466 A1* | 9/2022 | Thakur | H04L 63/102 |
| 2023/0086475 A1* | 3/2023 | Mosko | H04L 63/20 726/1 |
| 2023/0353503 A1* | 11/2023 | Payment | H04L 47/762 |

FOREIGN PATENT DOCUMENTS

| | | |
|---|---|---|
| CN | 107038380 A | 8/2017 |
| CN | 107066256 A | 8/2017 |
| CN | 107135221 | 9/2017 |
| CN | 108123962 A | 6/2018 |
| CN | 110138788 A | 8/2019 |
| CN | 110188871 A | 8/2019 |
| CN | 110191120 A | 8/2019 |
| CN | 111611586 A | 9/2020 |
| CN | 112766374 A | 5/2021 |
| KR | 102079970 B1 | 4/2020 |
| WO | 0070463 A1 | 11/2000 |
| WO | 2007143226 A2 | 12/2007 |
| WO | 2019186722 A1 | 10/2019 |

OTHER PUBLICATIONS

Albanese, M., Pugliese, A., & Subrahmanian, V. (2013). Fast Activity Detection: Indexing for Temporal Stochastic Automaton-Based Activity Models. IEEE Transactions on Knowledge and Data Engineering, 360-373.

Bahl, P., Barham, P., & Black, R. (2006). Discovering Dependencies for Network Management. ACM HotNets.

BeyondTrust. (2018). Retina. Retrieved from Retina: https://www.beyondtrust.com/products/retina-network-security-scanner/.

CyVision. (2018). CyVision. Retrieved from CyVision: https://www.cyvisiontechnologies.com/.

GraphX. (2018). GraphX. Retrieved from GraphX: https://spark.apache.org/graphx/.

Leversage, D., & Byres, E. (2008). Estimating a system's mean time-to-compromise. IEEE Security & Privacy, 52-60.

Mitre. (2018). CVE. Retrieved from CVE: https://cve.mitre.org/.

MSR. (2018). Z3 Guide. Retrieved from Z3 Guide: https://rise4fun.com/z3/tutorialcontent/guide#h23.

Natarajan, A., Ning, P., Liu, Y., Jajodia, S., & Hutchinson, S. (2012). NSDMiner: Automated Discovery of Network Service Dependencies. IEEE INFOCOM.

NIST. (2018). Retrieved form https://nvd.nist.gov/.

OMG. (Mar. 2015). Data Distribution Service Specification Version 1.4. Retrieved from OMG DDS: https://www.omg.org/spec/DDS/About-DDS/.

RTI. (2017). RTI Routing Service. Retrieved from RTI Routing Service: https://rti.com/products/dds/routing-service.html.

SANS. (2002). SANS Institute, "Quantitative Risk Analysis Step-By-Step". Retrieved from Quantitative Risk Analysis Step-by-Step: https://www.sans.org/reading-room/whitepapers/auditing/quantitative-risk-analysis-step-by-step-849.

Schrecker, S., Soroush, H., & Molina, J. (2016). "Industrial Internet of Things vol. G4: Security Framework",. CreateSpace Independent Publishing Platform.

Soroush, H., Irey, P., & Pardo-Castellote, G. (2015). Next-Generation Cybersecurity for Advanced Real-Time Distributed Systems. Intelligent Ships Symposium.

StackOverflow. (2018). StackOverflow. Retrieved from StackOverflow: https://stackflow.com/.

Tenable. (2018). Nessus. Retrieved from Nessus: https://www.tenable.com/products/nessus/nessus-professional.

Venkatesan, S., Albanese, M., & Jajodia, S. (2015). Distributing Stealthy Botnets through Strategic Placement of Detectors. IEEE Conference on Communications and Network Security (IEEE CNS).

Venkatesan, S., Albanese, M., Cybenko, G., & Jajodia, S. (2016). A Moving Target Defense Approach to Disrupting Stealthy Botnets. ACM Workshop on Moving Target Defense (MTD).

Welsh, M. (2013). What I Wish System Researchers Would Work On. Retrieved from http://matt-welsh.blogspot.com/2013/05/what-i-wish-systems-researchers-would.html.

Xu, Tu., & Zhou, Y. (2015). Systems Approaches to Tackling Configuration Errors: A Survey. ACM Comput. Surv.

Gemini George, A Graph-Based Security Framework for Securing Industrial IoT Networks From Vulnerability Exploitations, IEEE Access (vol. 6, pp. 43586-43601), Jan. 1, 2018, 16 pages (Year: 2018).

Brigitte Boden, Mining Coherent Subgraphs in Multi-Layer Graphs with Edge Labels, Data Management and Data Exploration Group RWTH Aachen University, Germany, Proceedings of the 18th ACM

(56) References Cited

OTHER PUBLICATIONS

SIGKDD international conference on Knowledge discovery and data mining, Aug. 2012 pp. 1258-1266 (Year: 2012).

Ibifubara Iganibo, Vulnerability Metrics for Graph-based Configuration Security, 2021, Center for Secure Information Systems, George Mason University, Fairfax, U.S.A. ,Palo Alto Research Center, Palo Alto, U.S.A, 12 pages (Year: 2021).

Massimilliano Albanese, A Graphic Model to Assess the Impact of Multi-Step Attacks, Journal of Defense Modeling and Simulation: Applications, Methodology, Technology, 2018, vol. 15(1) 79-93 (Year: 2018) Retrieved from https://journals.sagepub.com/doi/pdf/10.1177/1548512917706043.

Mridul Sankar Barik, A Graph Data Model for Attack Graph Generation and Analysis, Dept. of Comp. Sc. and Engg., Jadavpur University Kolkata, India {msbarikm,chandanm}@cse.jdvu.ac.In. 2014, 12 pages (Year: 2014).

\* cited by examiner

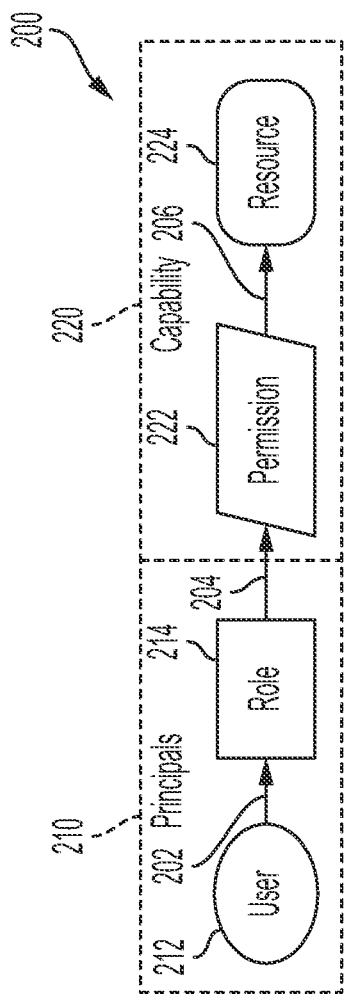
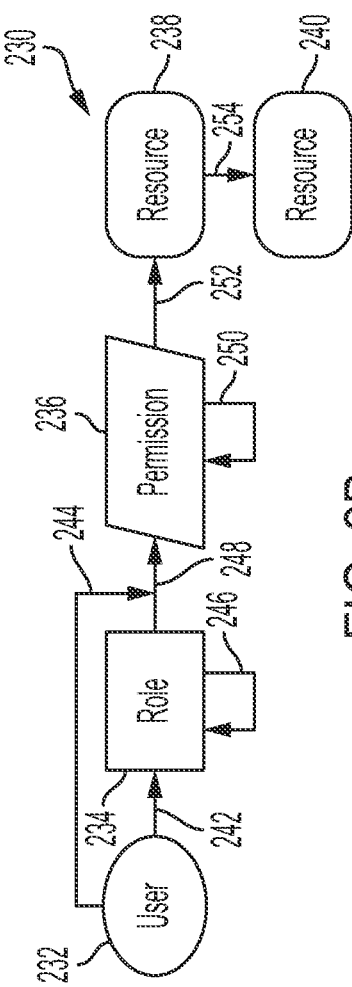
FIG. 2A
FIG. 2B

```
{
  "domains": [""],
  "computers": [""],
  "users": [""],
  "trust_relations": [{"domain": "", "trusted": [""]}],
  "roles": [""],
  "memberships": [{"roles": "", "members": [""]}],
  "privileged": [""],
  "unauthenticated_principals": [""],
  "permissions": [""],
  "effective_perms": [{"permission": "", "implies": [""]}],
  "resource_types": [""],
  "resource_permissions": [{"type": "", "permissions": [""]}],
  "resources": [{"name": "", "domain_name": "", "type": "", "target": ""}],
  "resource_containment": [{"container": "", "contains": [""]}],
  "capability_assignments": [
      {"principal": "",
       "capabilities": [{"permission": "", "resource": ""}]}]
}
```

FIG. 7B

```
{"source": "user", "target": "capability", "cost": 10},
{"source": "_ASSIGNED_", "target": "_ASSIGNED_", "cost": 1},
{"source": "user", "target": "_ANY_", "cost": null}
```

```
"capability_assignments": [
    {
        "principal": "LM-NAWS01\\Administrators",
        "capabilities": [
        {"permission": "login", "resource": "LM-NAWS01"}]
    },
    {
        "principal": "LM\\alice",
        "capabilities": [
        {"permission": "install", "resource": "LM-DC01"},
        {"permission": "read", "resource": "LM-DC01:E:\\Shares\\
            HRPolicies"}]
    }]
```

SYSTEM AND METHOD FOR SECURING WINDOWS DISCRETIONARY ACCESS CONTROL

RELATED APPLICATIONS

This application claims the benefit of U.S. Provisional Application No. 63/245,349, titled "System and Method for Securing Windows Discretionary Access Control," by inventor Marc E. Mosko, filed 17 Sep. 2021 (hereinafter "U.S. Pat. App. No. 63/245,349"), the disclosure of which is incorporated herein by reference in its entirety.

This application is related to:

U.S. patent application Ser. No. 16/219,774, entitled "Method for Improving the Security of a Networked System by Adjusting the Configuration Parameters of the System Components," by inventors Hamed Soroush and Shantanu Rane, filed 13 Dec. 2018 and issued 1 Jun. 2021 as U.S. Pat. No. 11,025,661 (hereinafter "U.S. Pat. No. 11,025,661"), which application claims the benefit of U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018; and is further related to U.S. patent application Ser. No. 16/918,971, entitled "System and Method for Constructing a Graph-Based Model for Optimizing the Security Posture of a Composed Internet of Things System," by inventors Hamed Soroush, Milad Asgari Mehrabadi, Shantanu Rane, and Massimiliano Albanese, filed 1 Jul. 2020 (hereinafter "U.S. patent application Ser. No. 16/918,971"); and U.S. patent application Ser. No. 16/923,763, entitled "System and Method for Reasoning About the Optimality of a Configuration Parameter of a Distributed System," by inventors Hamed Soroush and Shantanu Rane, filed 8 Jul. 2020 (hereinafter "U.S. patent application Ser. No. 16/923,763"); the disclosures of which are herein incorporated by reference in their entirety.

STATEMENT OF GOVERNMENT-FUNDED RESEARCH

This invention was made with U.S. government support under (Contract Number) Award Number: FA8750-18-0147 awarded by the Defense Advanced Research Projects Agency (DARPA) of the Department of Defense (DoD). The U.S. government has certain rights in the invention.

BACKGROUND

Field

This disclosure is generally related to Windows discretionary access control. More specifically, it is related to a system and method that implements the Secure Configurations for the Internet of Things (IoT) Based on Optimization and Reasoning on Graphs (SCIBORG) role-based access control (RBAC) model and solver for Windows discretionary access control.

Related Art

Currently, SCIBORG uses information representing system components, parameters, and interdependencies in a multi-layer graph to determine a configuration for a system. The multi-layer graph can include a dependency graph, a vulnerability graph, and a configuration graph. The determined configuration can optimize the functionality, security, and utility of the system while minimizing the impact of vulnerabilities to the system (e.g., damage from attackers).

The Windows Role-Based Access Control Model (RBAC) model can be used in various Windows subsystems, including the file system, registry keys, group policy objects, printing, etc. Each subsystem can include a set of resources (e.g., files and directories, registry keys, or printers) as well as a set of permissions on those resources. The RBAC model can allow an administrator to assign zero or more Access Control Entries (ACEs) to each resource. An ACE for a resource can specify the security principal (usually a user or a group), the permission, and whether the permission is allowed or denied. Windows can use an algorithm to compute a principal's effective permissions by looking at the order and contents of each ACE entry. Computing the effective rights of a specific principal on a resource can involve evaluating user, group membership, and inherited permissions until a deny or allow result is reached. This computation must be performed for each resource and each permission. Due to the interaction of deny and allow permissions via nested groups, inheritance, or blocked inheritance, an administrator may encounter challenges in understanding what the resulting effective right may be upon changing memberships, group permissions, or user permissions.

SUMMARY

A system and method are provided to facilitate securing Windows discretionary access control. During operation, the system determines a Windows domain model including capability assignments of principals on resources, wherein a respective capability assignment comprises a permission of a respective principal to a respective resource and wherein a respective principal comprises a user or a group of users. The system specifies desired effective permissions of each principal to each resource. The system generates, based on the specified desired effective permissions, access control entries for the respective principal to the respective resource. The system generates, based on the specified desired effective permissions, group memberships indicating which users belong to which groups.

In some embodiments, the access control entries enumerate a local allow permission, a local deny permission, an inherited allow permission, and an inherited deny permission of a respective principal to a respective resource. At least one of the following rules is applied: the local deny permission trumps the local allow permission; the local allow permission trumps the inherited allow permission and the inherited deny permission; the inherited deny permission trumps the inherited allow permission; and inheritance of permissions is prohibited.

In some embodiments, the respective resource comprises a Windows element or entity which uses role-based access control (RBAC).

In some embodiments, the group of users is configured by bundling principals based on at least one of: configuring principals for the group; and assigning and using a notional role for the principals of the group.

In some embodiments, generating the Windows domain model and specifying the desired effective permissions is based on a scenario file. The scenario file includes: a desired specification which defines a physical structure of the Windows domain model and a desired state of the capability assignments; a current configuration of the Windows domain model; and a policy file with rules indicating how to achieve the desired state of capability assignments.

In some embodiments, generating the access control entries and the group memberships is further based on the policy file.

In some embodiments, generating the access control entries and the group memberships based on the specified desired effective permissions comprises: solving for the desired state of the capability assignments by reducing a number of changes to be made to the current configuration.

In some embodiments, the current configuration specifies at least one of: current capability assignments; and current local allow permissions and local deny permissions.

In some embodiments, the policy file indicates preferences of relationships between the users, groups, and resources within a single domain or between multiple domains in the Windows domain model.

In some embodiments, generating the group memberships based on the specified desired effective permissions comprises: caching enabled paths used to generate, based on the specified desired effective permissions, the access control entries for the respective principal to the respective resource, wherein the enabled paths conform to the rules indicated in the policy file; and determining an expanded membership parameter for each group, wherein the expanded membership parameter includes transitive nesting of group memberships based on enabled paths.

In some embodiments, the system transmits, to a python RBAC module, the scenario file for processing to obtain a multi-layer graph. The system executes, by a reasoner component, a process on the multi-layer graph to obtain a recommended configuration, wherein the process optimizes a functionality, security, and utility of components while minimizing an impact of vulnerabilities. The system generates, by the reasoner component based on the recommended configuration, a report comprising at least one of: choices made by the reasoner component in selecting the recommended configuration, including prioritization of a first constraint over a second constraint; a description of capabilities assigned to users and resources; and a description of group memberships.

In some embodiments, generating the access control entries based on the specified desired effective permissions comprises: determining a convolved matrix for the desired effective permissions of a first resource. Columns in the convolved matrix indicate capabilities as pairs of a principal and a permission, and rows in the convolved matrix indicate a local allow permission, a local deny permission, an inherited allow permission, and an inherited deny permission for a respective pair. The system sets entries in the convolved matrix based on at least one of: whether a respective principal is a member of a respective group; an entry in a corresponding row of an assigned permission vector indicating the local allow permission or the local deny permission for the respective group; whether the first resource is a child resource that inherits permissions from a parent resource; and an entry in a corresponding row of a convolved matrix for the parent resource indicating the local deny permission and the local allow permission and at least one of the inherited allow permission and the inherited deny permission.

BRIEF DESCRIPTION OF THE FIGURES

FIG. 2A illustrates a basic RBAC model, in accordance with an embodiment of the present application.

FIG. 2B shows an enhanced RBAC model, in accordance with an embodiment of the present application.

FIG. 7B depicts an exemplary specification file in JSON format referenced from a scenario file, in accordance with an embodiment of the present application.

FIG. 7E depicts exemplary capability assignments from a specification file, in accordance with an embodiment of the present application.

In the figures, like reference numerals refer to the same figure elements.

DETAILED DESCRIPTION

Figure 1:
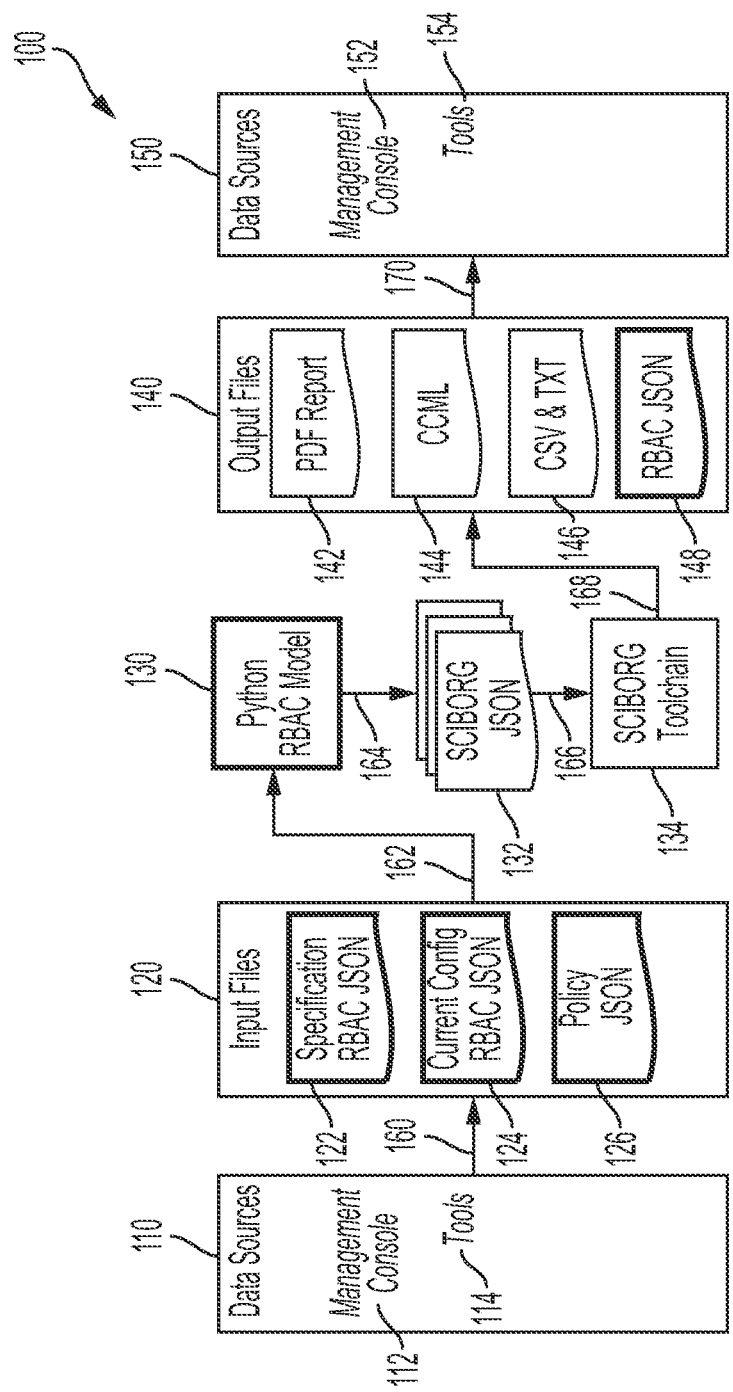
FIG. 1 illustrates an exemplary environment for facilitating Windows discretionary access control, including as part of the current SCIBORG system, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview of Application of SCIBORG to Windows RBAC Model

The embodiments described herein provide a system which allows an administrator to specify the final effective permissions for each user on each resource (e.g., in a Windows-based system) and which calculates "local" allow/deny permissions on specific resources as well as group memberships.

The Windows Role-Based Access Control Model (RBAC) model can be used in various Windows subsystems, including the file system, registry keys, group policy objects, printing, etc. Each subsystem can include a set of resources (e.g., files and directories, registry keys, or printers) as well as a set of permissions on those resources. Such permissions may vary from subsystem to subsystem. For example, even if the name is the same (e.g., "Read"), the semantic meaning may vary.

The RBAC model can allow an administrator to assign zero or more Access Control Entries (ACEs) to each resource. An ACE for a resource can specify the security principal (usually a user or a group), the permission, and whether the permission is allowed or denied. The resource itself can be implicit in the ACE entry, as the ACE entry is stored on the resource itself. Windows can use an algorithm to compute a principal's effective permissions by looking at the order and contents of each ACE entry. If the principal of an ACE entry is a group, the ACE entry can apply to all (possibly nested) members of the group.

Computing the effective rights of a specific principal on a resource can involve evaluating user, group membership, and inherited permissions until a deny or allow result is reached. This computation must be performed for each resource and each permission. Due to the interaction of deny and allow permissions via nested groups, inheritance, or blocked inheritance, an administrator may encounter challenges in understanding what the resulting effective right may be upon changing memberships, group permissions, or user permissions.

The described embodiments address these challenges by providing a system which allows an administrator to specify the final effective permissions for each user on each resource (e.g., in a Windows-based system) and which subsequently calculates "local" allow/deny permissions on specific resources and group memberships. To simplify the process of specifying the final effective permissions, the system allows the administrator to use groups, group memberships, and group permissions in a specification (e.g., in a specification portion of a scenario file, as described below in relation to FIGS. 7A and 7B). The system also allows the administrator to use "notional" or shorthand roles in the specification solely for the sake of convenience, i.e., without having those notional roles translate into configured groups or group memberships.

As described above, the current RBAC model allows an administrator to assign ACE entries to each resource, where an ACE for a resource can specify the security principal (usually a user or a group), the permission, and whether the permission is allowed or denied. Windows can use an algorithm to compute a principal's effective permissions, by inspecting the order and contents of each ACE entry.

In the described embodiments, the system can use an equivalent but different framing of ACE entries. A "capability" can be defined as a specification permission on a specific resource, and principals can be denied or allowed a respective capability. That is, in a Windows domain model with capability assignments of principals on resources, a respective capability assignment can include a permission of a respective principal to a respective resource, and a respective principal can include a user or a group of users (as described below in relation to FIGS. 2A and 2B).

Furthermore, Windows RBAC can allow for the inheritance of capabilities. For example, if resources have a hierarchical structure, ACE entries made a higher level may inherit to their children. Windows RBAC can also allow an administrator to block inheritance between specific parent-child links. Moreover, not all resources have inheritable permissions (e.g., printer resources generally do not have any children).

FIG. 1 illustrates an exemplary environment 100 for facilitating Windows discretionary access control, including as part of the current SCIBORG system, in accordance with an embodiment of the present application. Data sources 110 can include a management console 112 and tools 114. Data sources 110 can provide information for the generation or creation of input files 120 (via a communication 160). Input files 120 can include one or more Javascript Object Notation (JSON) files, e.g., a single scenario JSON file (as in FIG. 7A) which references one or more other JSON files, including at least: a specification RBAC JSON 122; a current configuration RBAC JSON 124; and a policy JSON 126. Input files 120 can describe the RBAC configuration and desired properties. Input files 120 can be sent to and processed or ingested by a Python RBAC model 130 (via a communication 162). Python RBAC model 130 can generate a SCIBORG JSON 132, which can include and specify the multi-layer graph (as described in U.S. Pat. No. 11,025,661). That is, Python RBAC model 130 can translate from the JSON-formatted input files 120 to SCIBORG JSON files (via a communication 164).

A SCIBORG toolchain 134 can receive and further process the multi-layer graph (via a communication 166). For example, a reasoner component can execute against a Neo4j database by solving the multi-layer graph given conflicts, by selecting certain constraints for relaxing, and by balancing the utility of the components with the severity of the vulnerabilities (as described in U.S. patent application Ser. No. 16/923,763). SCIBORG toolchain 134 (including the Reasoner component) can execute the testbed generated by the Python code (generated by Python RBAC Model 130) and can also generate output files 140 (via a communication 168). Output files 140 can include, but are not limited to: a PDF report 142; a CCML 144; a CSV and TXT file 146; and an RBAC JSON 148. Output files 140 may be sent to data sources 150 (via a communication 170), for an extra post-processing step to translate between the encoded symbolic names used in SCIBORG back to the real-world names used in the original RBAC specification. For example, data source 150 can include data to be displayed on a management console 152 and to be manipulated, viewed, accessed, or processed by tools 154.

As described herein, the described embodiments (e.g., the SCIBORG RBAC Model and solver) can enforce a set of rules which will always be held true, including:
1. A security domain trusts itself.
2. A role may contain a user from a trusted domain.
3. A role may contain a role from a trusted domain.
4. A capability may be assigned to a user or a role from a trusted domain.
5. A permission may imply one or more other permissions on the same resource.
6. A resource exists in a single security domain.

7. All permissions on a resource are in the same security domain as the resource.
8. A resource has a specific type
9. A resource may contain another resource of the same type, within the same domain.
10. A role cannot be a member of itself.
11. Role memberships do not form cycles.
12. Resource containment does not form cycles.
13. A capability assigned to a role inherits to all members.
14. A permission assigned to a resource inherits to all contained resources.

The described embodiments can include an engine (e.g., the solver) which configures security and can: add or remove users from roles; add or remove roles from roles; and assign capabilities to users or roles. The solver cannot create new users, roles, or capabilities.

The described embodiments can support several types of security policies. These policies can affect how the solver assigns users to roles and capabilities to principals. For example, in an Active Directory (AD) tree, one policy may prefer to put users in groups in their local domain, and subsequently use those groups for inter-domain memberships. Another policy may require that a capability only be assigned to groups in the same domain, and never directly to a principal outside the domain.

The described system can represent these types of policies via a cost function that depends upon the pair-wise relationship of the entities. The cost function can also prohibit a relationship entirely. The policies can also include a few rules about what is or is not allowed. These rules can be defined by flags and hard-coded in the model. In some embodiments, a modular plug-in expression language may be used to allow a user to write Python or similar predicates to test object attributes.

RBAC Overview; Exemplary ACE Creation Workflow; Challenges Due to Complicated Permissions FIG. 2A illustrates a basic RBAC model 200, in accordance with an embodiment of the present application. A user may be in zero or more roles, and a role may contain zero or more users. Roles may have capabilities, where a capability is an assignment of a specific permission on a specific resource. Permissions can be specific to resources. For example, file system resources may have permissions like read, write, delete, list, and execute, while a computer resource may have permissions like install software, debug programs, or use the USB port. As another example, Active Directory Organizational Units may have permissions like delegate or manage. An exemplary diagram of registry key permissions is described below in relation to FIG. 4.

In basic RBAC model 200, a user 212 can have a role 214 (or be associated with or be a member of a group 214) (via a relation 202). A role 214 can have a permission 222 (via a relation 204) on a particular resource 224 (via a relation 206). For example, a user "Alice" may be in the Engineering role, and the Engineering role may have read and write permissions to a specific shared folder.

The described embodiments can use an enhanced RBAC model. FIG. 2B shows an enhanced RBAC model 230, in accordance with an embodiment of the present application. In enhanced RBAC model 230, a capability may be assigned directly to a user, roles may be nested, a permission may imply other permissions, and resources may contain other resources. Nested roles may imply capability inheritance. For example, if Alice is in the Engineering role and Engineering is in the Product Development role, any capabilities assigned to Product Development are inherited to both Engineering and Alice. Furthermore, in some systems, the write permission may imply the read permission, and the execute permission may imply the read permission.

In enhanced RBAC model 230, a user 232 can have a role 234 (or be associated with or be a member of a group 234) (via a relation 242). Roles or groups can be nested, i.e., a role or group can be a member of another role or group (via a relation 246). User 232 or role 234 (via, respectively, relations 244 and 248) can have a permission 236 on a resource 238 (via a relation 252). Permission 236 can imply other permissions (via a relation 250), and permissions can also be inherited or blocked. Resource 238 can contain other resources, including a resource 240 (via a relation 254), such as directories, registry keys, and Group Policy Objects (GPOs). An example of nested groups and contained resources is described below in relation to FIG. 3.

Furthermore, varying trust relationships may exist between users and group of the same or a different domain. For example, if a trust relationship exists from a domain A to a domain B (i.e., domain A trusts domain B), then users and groups of domain B can be used inside domain A (i.e., as if they were inside domain A). In addition, the system may includes many different resource types, such as file systems, ADs, registry keys, etc., where each resource type may have its own set of permissions and where some permissions may imply other permissions, as depicted below in relation to FIG. 4.

Figure 3:
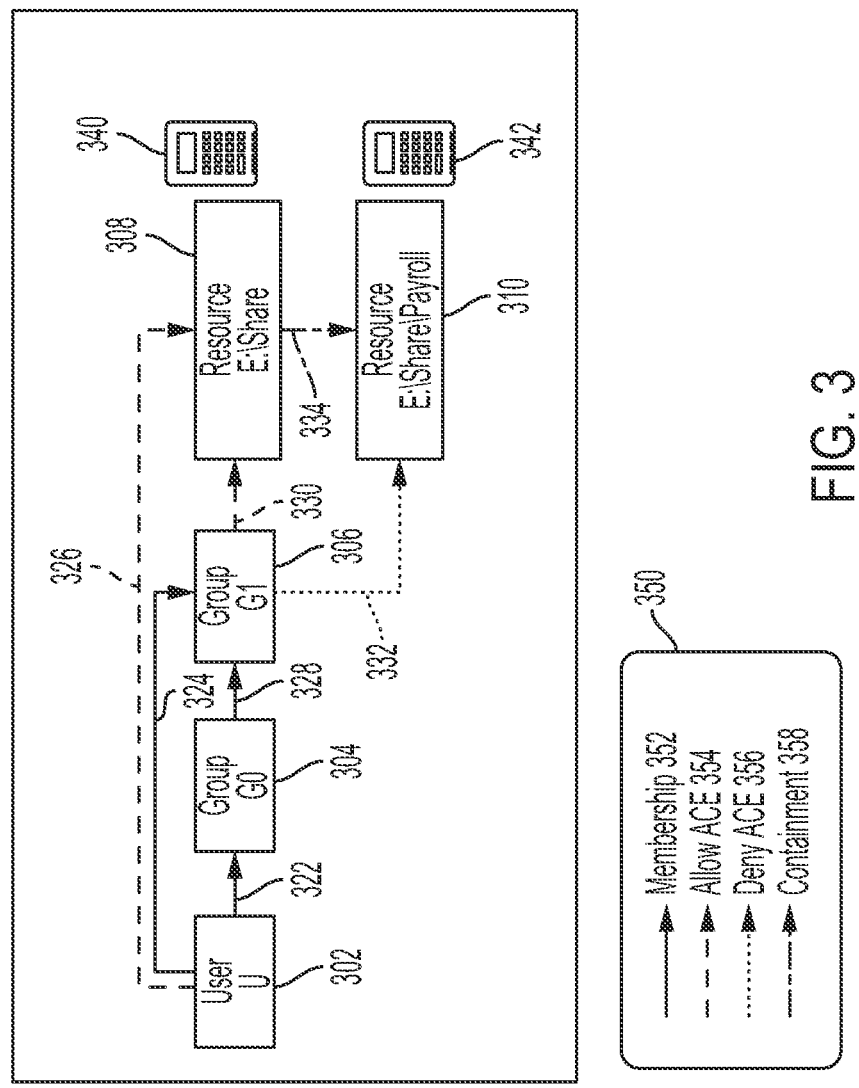
FIG. 3 illustrates an exemplary ACE creation workflow, in accordance with an embodiment of the present application.

FIG. 3 illustrates an exemplary ACE creation workflow 300, in accordance with an embodiment of the present application. An index 350 can indicate various types of relations between entities in workflow 300, e.g.: a solid-line arrow can represent a membership relation 352; a dashed-line arrow can represent an allow ACE relation 354; a dotted-line arrow can represent a deny ACE relation 356; and a dotted/dashed-line arrow can represent a containment relation 358.

As described above, users can belong to groups, groups can belong to groups, and resource can contain other resources. Workflow 300 can include a user U 302 which belongs to, is associated with, or is a member of a group G0 304 (via a membership relation 322) and a group G1 306 (via a membership relation 324). Group G0 304 can be a member of group G1 306 (via a membership relation 328). A resource 308 ("E:\Share") can contain a resource 310 ("E:\Share\Payroll") (via a containment relation 334).

A user or a group may have a direct allow or deny permission on a given resource. For example, user U 302 can have an allow ACE permission to resource 308 (via an allow relation 326). Group G1 306 may also have an allow ACE permission to resource 308 (via an allow relation 330). Group G1 306 may have a deny ACE permission to resource 310 (via a deny relation 332). Current RBAC models may perform effective rights calculations 340 and 342 for, respectively, resources 308 and 310. As described above, computing or calculating the effective rights of each principal on each resource can involve a complex process of evaluating user, group membership, and inherited permissions until reaching a deny or allow result. Because of the interaction between deny and allow permissions via nested groups, inheritance, or blocked inheritance, it may be challenging for an administrator to determine or understand the impact of changing memberships or group or user permissions on the effective rights.

The Windows domain model may include a structure with multiple domains, users, groups, resource, and permissions, where groups can be nested, permissions can be inherited (as described below in relation to FIG. 4) or blocked, resources can contain other resources (as described above in relation to FIGS. 2B and 3), and varying trust relationships may exist between users and group of the same or a different domain (as described below in relation to FIG. 7F).

Figure 4:
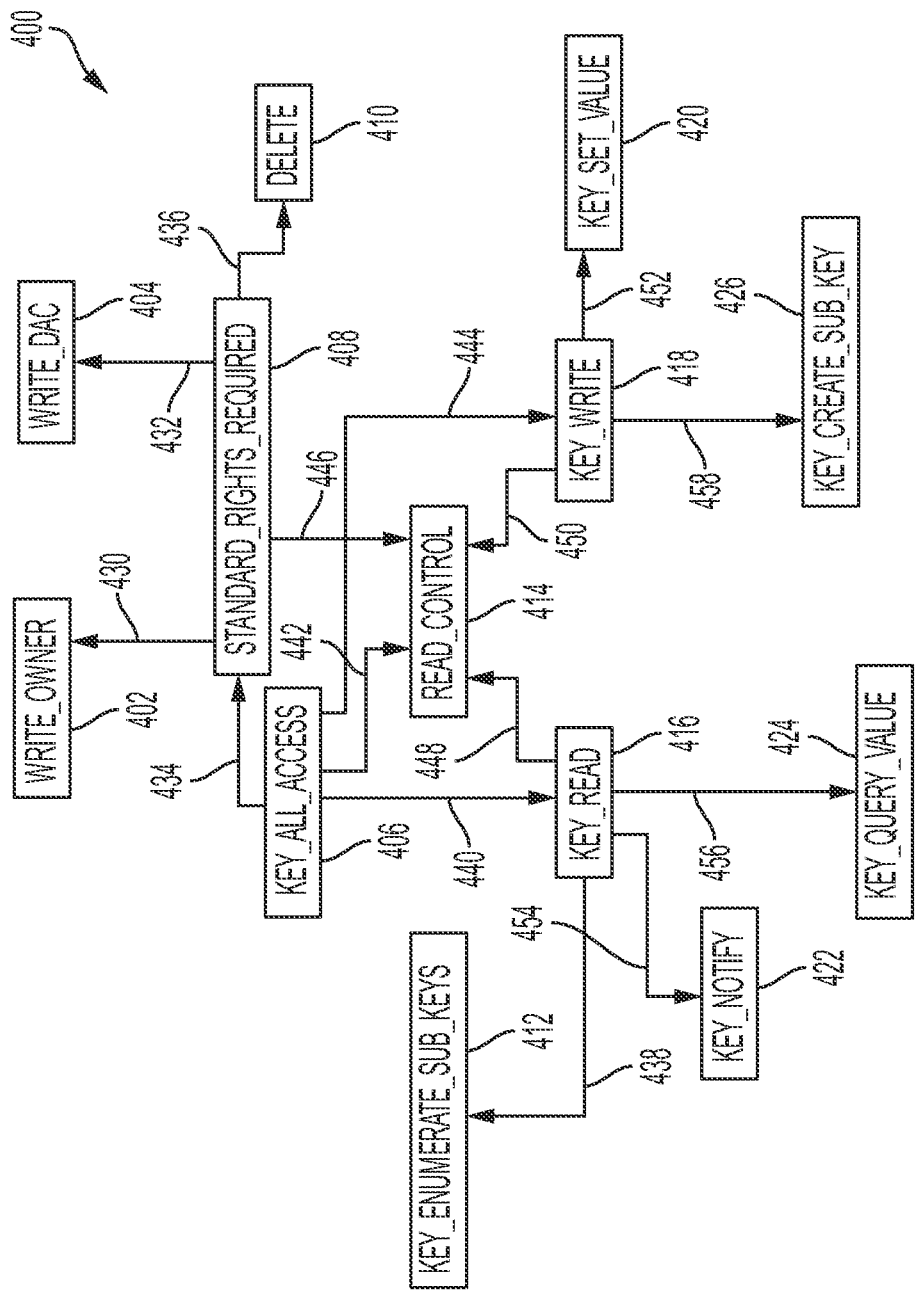
FIG. 4 illustrates a diagram with an example of registry key permissions, in accordance with an embodiment of the present application.

FIG. 4 illustrates a diagram 400 with an example of registry key permissions, in accordance with an embodiment of the present application. Diagram 400 can include permissions with inherited permissions. A key_all_access 406 can imply the following four permissions: a key_read permission 416; a read_control permission 414; a key_write permission 418; and a standard_rights_required permission 408 (as indicated respectively by arrows 440, 442, 444, and 434). The standard_rights_required permission 408 can imply the following three permissions: a write_owner permission 402; a write_DAC permission 404; and a delete permission 410 (as indicated respectively by arrows 430, 432, and 436). The key_read permission 416 can imply the following four permissions: a key_enumerate_sub_keys permission 412; a key_notify permission 422; a key_query_value permission 424; and read_control permission 414 (as indicated respectively by arrows 438, 454, 456, and 448). The key_write permission 418 can imply the following three permissions: read_control permission 414; a key_set_value permission 420; and a key_create_sub_key permission 426 (as indicated respectively by arrows 450, 452, and 458).

Resource containment is similar to role nesting. A disk drive, such as a Windows E: drive, can contain all the top-level folders, e.g. E:\Shared, E:\Home. Each of those top-level folders, in turn, may contain other folders and files. Permissions (e.g., each permission as indicated in FIG. 4) assigned to a container can be inherited by the contained resources. Resource containment can apply to any resource type, such as registry keys, network subnets, or service chaining.

Windows Algorithm to Determine Allow/Deny Based on ACEs

The Windows algorithm can represent ACEs as a queue, where the resource is implicit in the ACE entry, as the ACE queue can be stored on the resource itself. An ACE entry can include {Principal, Action, Permission(s)}, e.g., {"George," "Deny," and "[Read, Write]" }. Assume that R is a resource of interest, e.g., C:\A\B. While R is not empty (i.e., not NONE), the system can collect all the Deny ACE entries from the resource R and append them to the ACE queue for resource R. The system can collect all the Allow ACE entries for the resource R and append them to the ACE queue for resource R. The system can then perform the same actions for the parent of R, by setting R to R.parent (e.g., C:\A), and continue these operations until the root or main parent has been reached (e.g., C:\). Thus, the system can append ACE entries from higher directory levels as it continues performing the same above-described actions.

The Windows algorithm can also test if a given permission P is allowed for a user U and for every group Gi of which user U is a member. For each ACE, starting from the head and moving to the tail of the ACE queue, if any of {U, Gi} matches a given ACE and the permission on the given ACE is the given permission P, then the system will Allow or Deny the given permission P for the respective {U, Gi} based on the given ACE.

Calculating Effective Permissions Based on Assigned Permissions and Group Membership The described embodiments can use bit vectors to represent the ACEs, in which each column of a bit vector represents a principal and a permission (e.g., Alice Read, Alice Write, Bob Read, Bob Write, Group1 Read, Group1 Write). An oversimplified example of an effective permissions calculation in logic is described below in relation to FIGS. 5A and 5B. The effective permissions can be represented as a single bit vector, which is based on the following four values: a local allow (LA) permission; a local deny (LD) permission; an inherited allowed (IA) permission; and an inherited deny (ID) permission. The effective permission E (or "eff( )") can be calculated as follows, where 1 is true and 0 is false: E=Not LD AND (LA OR (NOT ID AND ID)). If LD is true (1), then E is false (0). If LD is false (0), then the system evaluates LA: If LD is false (0) and LA is true (1), then E is true (1); if LD is false (0) and LA is false (0), but if ID is false (0) and IA is true (1), then E is true (1); and if LD is false (0) and LA is false (0), but if ID is true (1), then E is false (0).

Thus, the system can represent every possible (Principal, Permission) pair as a bit vector and then evaluate a predicate to determine what is allowed or denied. However, as described above, due to the interaction of deny and allow permissions via nested groups, inheritance, or blocked inheritance, the situation may become more complex. Each resource can include a set of assigned Allow and Deny permissions, which must be "convolved" or mixed with all possible groups (i.e., combined while taking into account group memberships) to yield the possible effective set of permissions for a user. The system can also combine these with inherited permissions and evaluate the effective rights equation for any "child" resources.

Figure 5A:
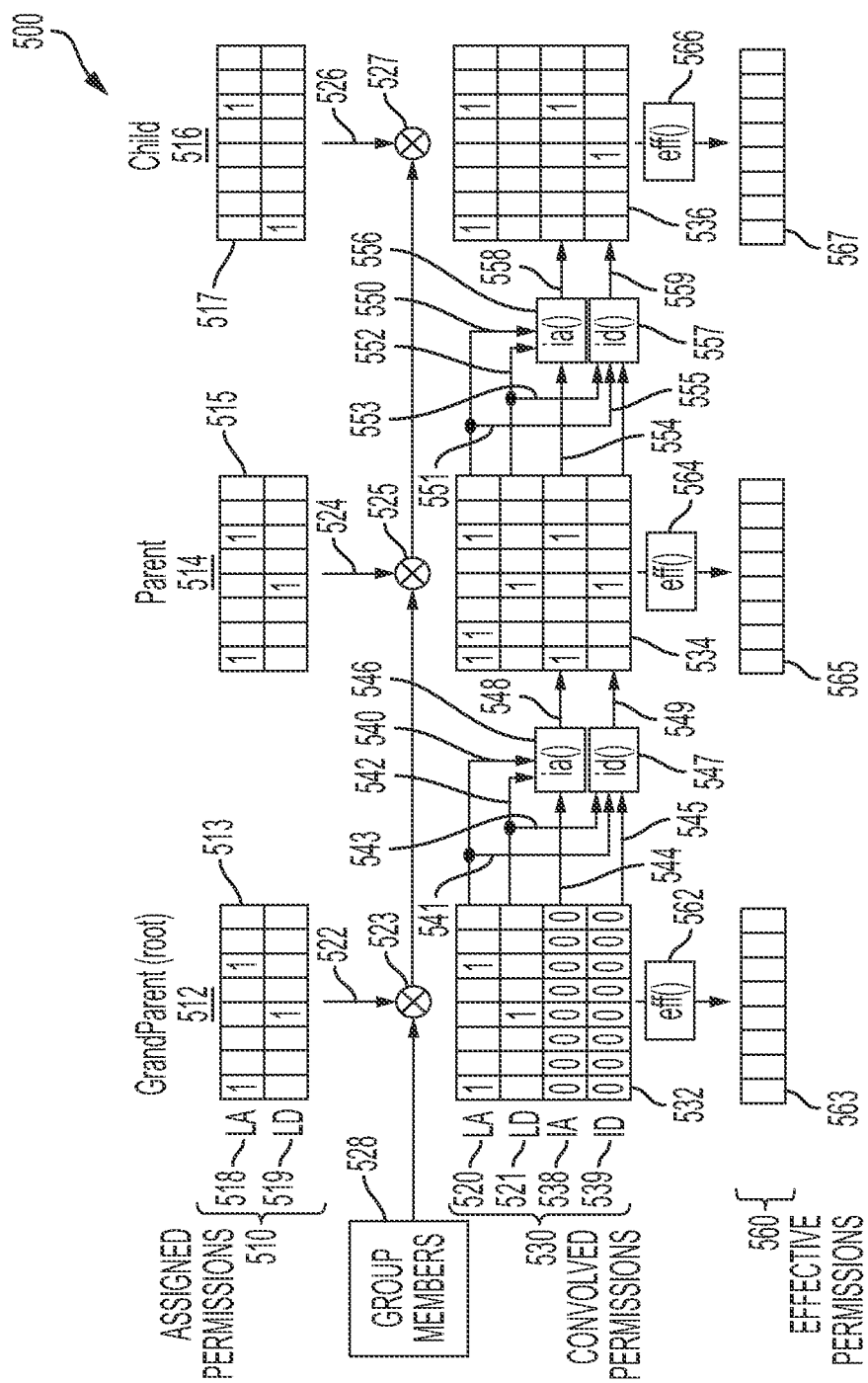
FIG. 5A illustrates a diagram for calculating the effective permissions on resources, including assigned permissions, assigned group memberships, a convolved matrix of permissions, and effective permissions, in accordance with an embodiment of the present application.

The described embodiments address the complexities of determining the effective permissions based on the interaction of deny/allow permissions while accounting for nested groups, inheritance, or blocked inheritance. FIG. 5A illustrates a diagram 500 for calculating the effective permissions on resources, including assigned permissions 510, assigned group memberships 528, convolved matrices of permissions 530, and effective permissions 560, in accordance with an embodiment of the present application. Diagram 500 can include three resources with inheritance. Each resource has a local allow (LA) 518 and a local deny (LD) 519 assigned permission vector. Each column of the vector can represent a capability assignment (i.e., a principal and a permission), such as "Alice READ," "Alice WRITE," "UserGroup( ) READ," "UserGroup( ) WRITE," etc. In diagram 500, assigned permissions 510 can include the following: a grandparent (root) 512 has an assigned permission vector 513; a parent 514 has an assigned permission vector 515; and a child 516 has an assigned permission vector 517. As described above, a resource can be a directory (e.g., C:, C:\apple, C:\apple\pie), a registry entry, an Active Directory object, etc. The permissions are specific to the resource. If a permission is denied (LD), that LD takes precedence and prevents an action or permission on the stated resource. If a permission is allowed (LA), that LA allows the principal (e.g., Alice) to perform the operation (e.g., READ) on the resource (e.g., Parent).

Group members 528 can indicate which users are in which groups and which groups are in which other groups. As an example, given three groups G0, G1, and G2, and user Alice, the following group memberships are possible: Alice does not belong to any group; Alice belongs to only one of G0, G1, and G2; Alice belongs to only one of (G0,G1), (G0,G2), and (G1,G2); Alice belongs to (G1,G2,G3); Alice belongs to G0, and G0 is in either G1 or G2; etc.

Circle-X symbols 523, 525, and 527 can denote the "convolving" or mixing of these described objects, i.e., information from group members 528 and assigned permission vectors 513, 515, and 517 for, respectively, the three resources 512, 514, and 516 via paths 522, 524, and 526. The effective permissions depend upon which permissions are assigned to which user/groups and how those user/groups may be nested together via group memberships (as indicated by group members 528). The term "convolving" can refer to a mixing of the described objects, and can further refer to expanding the assigned permissions, passing the expanded assigned permissions through the group memberships, and generated the expanded LA and LD.

Convolved permissions 530 can be represented by matrices which include the expanded LA 520 and LD 521 permissions of the corresponding resource as well as the inherited allow (IA) 538 and the inherited deny (ID) 539 permissions based on containment of resources and inheritance/blocking of permissions. IA 538 and ID 539 can describe how permissions propagate from a parent to a child resource. For example, if Alice has READ permission to grandparent 512, she would also have READ permission to parent 514 unless that specific permission is blocked by an LD Alice READ on parent 514.

Convolved permissions 530 can include the following: a convolved permission matrix 532 associated with grandparent (root) 512 resource; a convolved permission matrix 534 associated with parent 514 resource; and a convolved permission matrix 536 associated with child 516 resource.

Returning to assigned permissions 510, for each group column in assigned permission vectors 513, 515, and 517, the values for every member of that group column can be logically OR'ed into the respective "convolved LA" or "convolved LD" column. More specifically, for a resource R, the system can initialize the convolved matrix to 0 for each entry. For every group G and permission P, and for every principal S, the system can determine if S is a (possibly nested) member of G, and if so, set the two following values:

$$CONV_R[(S,P),LA] = CONV_R[(S,P),LA] \text{ OR } ASSGN_R[(G,P),LA] \quad (1)$$

$$CONV_R[(S,P),LD] = CONV_R[(S,P),LD] \text{ OR } ASSGN_R[(G,P),LD] \quad (2)$$

where (S,P) identifies the columns and LA, LD identifies the row, CONV is the convolved matrix, $CONV_R$ is the convolved matrix for resource R, ASSGN is the assigned matrix, and $ASSGN_R$ is the assigned matrix for resource R. Note that expressions (1) and (2) are written in an iterative, procedural style, and not as they would be expressed in first order logic.

In first order logic, expressions (1) and (2) can be written as:

$$(\text{member } S\ G) => \{(\text{member}(G,P)ASSGN\_LA[R]) => (\text{member}(S,P)CONV\_LA[R])\} \quad (3)$$

$$(\text{member } S\ G) => \{(\text{member}(G,P)ASSGN\_LD[R]) => (\text{member}(S,P)CONV\_LD[R])\} \quad (4)$$

Because expressions (3) and (4) use one-way implications (as depicted below in relation to FIG. 5B), another set of equations is needed to solve for the assigned capabilities given the convolved matrix, as described below.

Furthermore, if a child inherits permissions from its parent, then the system must use the IA( ) and ID( ) functions from the parent to the child. For each capability (S,P):

$$CONV_C[(S,P),IA] = (\text{NOT } CONV_P[(S,P),LD]) \text{ AND } (CONV_P[(S,P),LA] \text{ OR } CONV_P[(S,P),IA]) \quad (5)$$

$$CONV_C[(S,P),ID] = (CONV_P[(S,P),LD]) \text{ OR } (\text{NOT } CONV_P[(S,P),LA] \text{ OR } CONV_P[(S,P),ID]) \quad (6)$$

where $CONV_C$ is the child's convolved matrix and $CONV_P$ is the parent's convolved matrix.

Another way to represent expressions (5) and (6) is, respectively, as follows, where PAR is a parent resource and CHI is a child resource:

$$CHI.\text{convolved}.IA = (\text{not } PAR.\text{convolved}.LD) \text{ AND } (PAR.\text{convolved}.LA \text{ OR } PAR.\text{convolved}.IA) \quad (7)$$

$$CHI.\text{convolved}.ID = (PAR.\text{convolved}.LD) \text{ OR } (\text{NOT } PAR.\text{convolved}.LA) \text{ AND } (PAR.\text{convolved}.ID) \quad (8)$$

For example, IA( ) 546 for convolved matrix 534 for parent 514 ("child") can be calculated by taking input based on the LA and LD permissions of its parent, i.e., grandparent 512 ("parent") (via paths 540 and 542, respectively) as well as the IA permissions of its parent (i.e., grandparent 512) (via path 544). Similarly, ID( ) 547 for convolved matrix 534 for parent 514 ("child") can be calculated by taking input based on the LA and LD permissions of its parent, i.e., grandparent 512 ("parent") (via paths 541 and 543, respectively) as well as the ID permissions of its parent (i.e., grandparent 512) (via path 545).

As another example, IA( ) 556 for convolved matrix 536 for child 516 can be calculated by taking input based on the LA and LD permissions of its parent 514 (via paths 550 and 552, respectively) as well as the IA permissions of its parent 514 (via path 554). Similarly, ID( ) 557 for convolved matrix 536 for child 516 can be calculated by taking input based on the LA and LD permissions of its parent 514 (via paths 551 and 553, respectively) as well as the ID permissions of its parent 514 (via path 555).

After convolved matrices 532, 534, and 536 have been generated, the system can calculate the effective permissions for each resource ("eff( )"), indicated as 562, 564, and 566, which results, respectively, in effective permissions 563, 565, and 567. As described above, the algorithm for calculating these effective permissions is, in summary, as follows: If the permission is LD, then deny. Else if it is LA, then allow. Else if it is ID, then deny. Else if it is IA, then allow. Else deny.

How to Model Group Memberships

Modeling group memberships may be based on a policy specified in the scenario file. An exemplary scenario file and policy file are described below in relation to FIGS. 7A and 7C. The policy can specify the cost of different relationships among objects, such as the cost from a user to a group, a group to another group, a user to a resource, and a group to a resource. By adjusting these relationship costs in the policy, the administrator can lay out a policy which can use, prefer, or rely upon the organization of objects in the system.

The system can model these relationships as memberships. If a user or a group is a member of a group, the system can establish a path through the groups to a resource. If a user or group plus a permission is a member of a resource's discretionary access control list (DACL), the system can allow or deny the capability based on the ACE.

Figure 6:
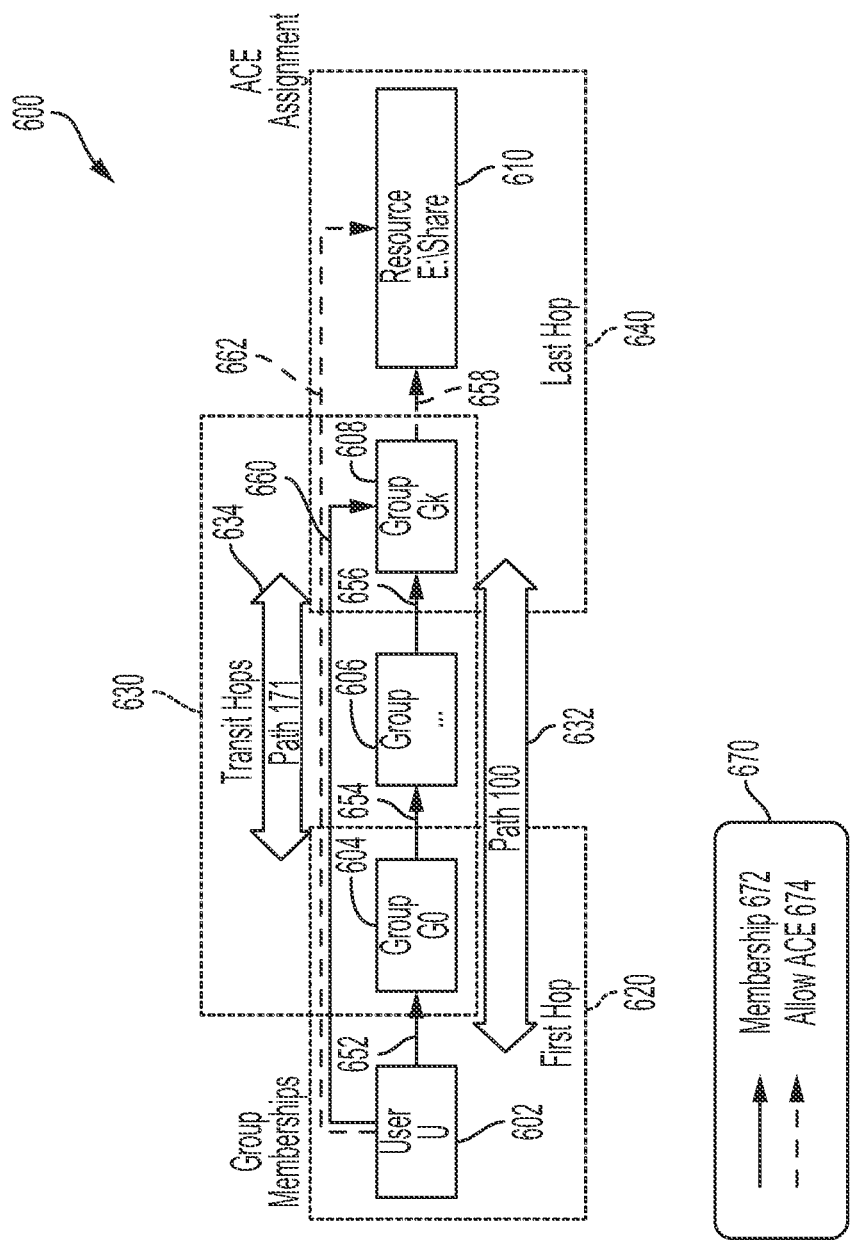
FIG. 6 depicts a diagram illustrating a schematic representation of the SCIBORG RBAC process, including an ACE assignment based on group memberships, transit hops, and a last hop, in accordance with an embodiment of the present application.

FIG. 6 depicts a diagram 600 illustrating a schematic representation of the SCIBORG RBAC process, including an ACE assignment based on group memberships, transit hops, and a last hop, in accordance with an embodiment of the present application. An index 670 can indicate various types of relations between entities in diagram 600, e.g.: a solid-line arrow can represent a membership relation 672; and a dashed-line arrow can represent an allow relation 674.

Diagram 600 can include a user U 602 which is a member of a group G0 604, which is a member of another group 606, which is a member of a group Gk 608, which has an allow permission to a resource 610. In diagram 600, the full path from user U to resource 610 can be divided between the following three sections: a first hop 620 (e.g., from user 602 to group G0 604 via a path 652); transit hops (if any) 630 (e.g., a path 171 634) and a last hop 640 (e.g., from Group Gk 608 to resource 610_). In addition, other paths are depicted, such as a path 100 632 from user U 602 to group Gk 608.

The last hop must always exist. If the first hop does not exist, a user is assigned a direct permission to a resource (e.g., an allow permission 662). If the transit hops do not exist, a user can belong to a first group, which first group has a permission assignment to a resource (e.g., a membership path 660 from user U 602 to group Gk 608, where group Gk has an allow permission 658 to resource 610).

The notation "(path N)" can be used to indicate a path with an index N (a natural number). In the logic solver of the instant system, these can be known as uninterpreted functions, and specifically, in this case, a function from a number to a Boolean (e.g., TRUE or FALSE). If (path N) is true, the path exists and all of the implied memberships are true. If (path N) is false, not all of the implied memberships are true (some or none may be true, but not all).

Diagram 600 depicts some sample paths which all lead to Gk:

(path 100)=>(path 171) or (path 172) or . . .

(path 0)=>(member $U$ $G0$)

(path 1)=>(member $G0$ $G1$) and (member $G1$ $G2$) and . . . (member $Gk-1, Gk$)

(path 2)=>(member $G0$ $Gk$)

. . .

(path 171)=>(path 0) and (path 1)

(path 172)=>(path 0) and (path 2)  (9)

In the example of FIG. 6: the first hop is (path 0); the feasible intermediate paths are (path 1) . . . (path j); and the overall paths are (path 171) . . . . The system can determine the feasible intermediate paths based on policy restrictions imposed by the administrator (e.g., via the policy file) and by other heuristics (e.g., based on Yen's algorithm). The system can use the above information, including the feasible intermediate paths, to reduce the total state in the system. For example, the system may only generate the top M shortest paths from U to Gk.

To establish a permission assignment, the system can use logic such as:

(member($U,P$) $R$.effective)=>

(OR (member($U,P$)$R$.effective)

(path 100) and (member($Gk,P$)$R$.effective)) . . . )  (10)

The system can enumerate the possible paths to a terminal group and lastly the final capability assignment to a resource. The case where (member (U,P) R.effective) is TRUE can correspond to the case where there is not a first hop or any transits, but only the last hop permission assignment.

The system can select the best or optimal paths by using MaxSAT constraints in the logic solver and further by using edge weights based on the policy file in order to determine a path cost. For example, note the following expression:

(assert-soft(not(path0)):weight 10)  (11)

This expression can instruct the logic solver to prohibit a path 0 (i.e., the path function operating on "0" can map to FALSE). If the solver needs path 0, e.g., to realize a permission requirement, the system must relax one of the soft constraints. The system will attempt to minimize the cost of the relaxed constraints, such that using the edge or path cost as the weight can achieve the purpose.

How SCIBORG Solves for Windows Assigned Permissions

Recall that FIG. 5A describes a framework for how to calculate the effective permissions given the assigned permissions and group memberships, including the convolved matrices. However, complexities and challenges exist in determining the effective permissions based on the interaction of deny/allow permissions while accounting for nested groups, inheritance, or blocked inheritance. The described embodiments can solve the problem indicated in FIG. 5A in reverse. That is, by starting with the effective permissions, the system can generate the assigned permissions and assigned group memberships, which can allow an administrator to set the effective permissions and subsequently generate or determine the underlying group memberships and actual Allow/Deny permissions for a given principal on a particular resource. This can result in a more modular and efficient system, as the administrator may merely set certain rules in the policy file and certain permissions in the scenario file (described below) and maintain a level of transparency or abstraction to the actual assigned Allow/Deny permissions and the group membership assignments, as described below in relation to FIG. 5B.

Figure 5B:
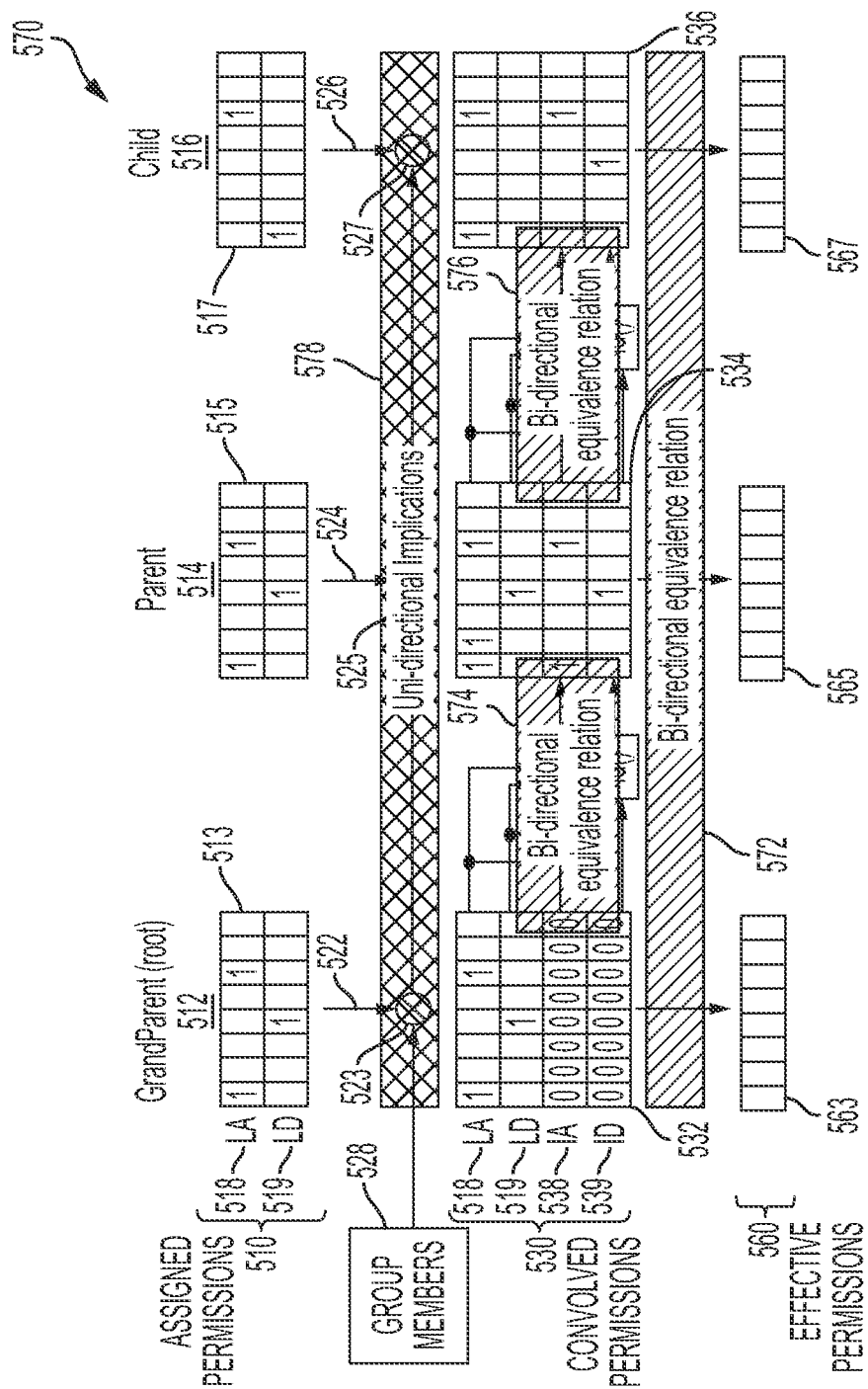
FIG. 5B illustrates a diagram solving the reverse problem indicated in FIG. 5A, by starting with the effective permissions and obtaining the assigned permissions and assigned group memberships by deconvolving certain data, in accordance with an embodiment of the present application.

FIG. 5B illustrates a diagram 570 solving the reverse problem indicated in FIG. 5A, by starting with effective permissions 560 and obtaining assigned permissions 510 and assigned group memberships 528 by "deconvolving" certain data, in accordance with an embodiment of the present application. Diagram 570 indicates that a bidirectional equivalence relation 572 exists between convolved matrices 532, 534, and 536 and effective permissions (eff( )) 563, 565, and 567. Diagram 570 further indicates that: a bidirectional equivalence relation 574 exists between convolved matrix 532 (for grandparent 512) and convolved matrix 534 (for parent 514); and a bidirectional equivalence relation 576 exists between convolved matrix 534 (for parent 514) and convolved matrix 536 (for child 516). However, uni-directional implications 578 exist between each convolved matrix and its corresponding assigned permissions, e.g.: between convolved matrix 532 and assigned permissions 513; between convolved matrix 534 and assigned permissions 515; and between convolved matrix 536 and assigned permissions 517. A detailed description of both bi-directional equivalence relations (572, 574, and 576) and uni-directional implications (578), including with equations on solving from assigned to convolved, convolving assigned with groups, and solving from convolved to assigned is provided below in the section titled "Access Control Entry Requirements."

Scenario File

A user or administrator can specify the system configuration using a scenario file, which can be a JSON file which collects or references a set of JSON files, as described below in relation to FIG. 7A. The three main types of information or JSON files referenced in the main scenario file include: the specification ("as-desired); the current state ("as-is"); and policies, which three types of information are indicated as 702, 704, and 706, respectively, in FIG. 7A. Each of these types of information can be in one or more JSON files, and referenced accordingly in the scenario file. The system can merge or append the referenced set of JSON files in any order. That is, one single large file may be used for the specification, current state, and policy information.

Figure 7A:
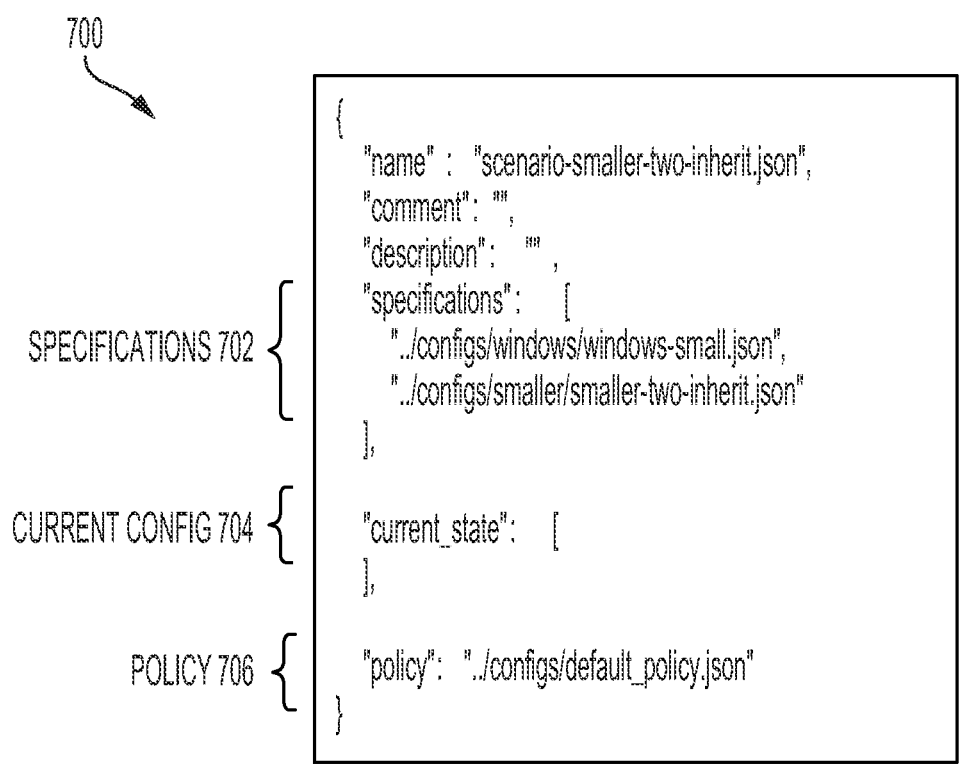
FIG. 7A depicts an exemplary scenario file in JSON format, in accordance with an embodiment of the present application.

FIG. 7A depicts an exemplary scenario file 700 in JSON format, in accordance with an embodiment of the present application. Scenario file 700 can include a name, a comment, and a description, as well as: specifications 702 (which can include calls to other JSON specification files, as depicted below in FIG. 7B); a current configuration 704; and a policy 706 (e.g., a call to a JSON policy file, as depicted below in FIG. 7C).

Scenario File: Specification

The specification can define domains, computers, users, groups, trust relations, roles, resources, etc., as described below and in relation to FIG. 7B. The specification can also include assigned capabilities, e.g., a permission on a resource for a principal, as described below in relation to FIG. 7E.

Because the system takes the union of multiple JSON files (e.g., multiple specification files), many fields in a given specification file may be left blank and specification files may be organized based on logical content or any other category. For example, one specification file for group membership may only define a particular role (group) and the members of the group, where all the other fields are blank. This file, and other similar files, may be merged with all specification files to create the overall scenario file or detailed manifest describing the structure and end goal configuration of the system.

FIG. 7B depicts an exemplary specification file 710 in JSON format referenced from a scenario file, in accordance with an embodiment of the present application. Specification file 710 can include or define domains, computers, users, trust relations, roles, groups/memberships, privileged indicators, unauthenticated principals, permissions, effective permissions, resource types, resource permissions, resources, resource containment, and capability assignments. Each of these elements is described in further detail in U.S. Pat. App. No. 63/245,349.

Scenario File: Current Configuration

The scenario file can also include or reference a current configuration file, which can be of a similar JSON format as the specification files and can specify a current state of the system. The current configuration may not exactly match or include the same elements as the desired specifications.

Scenario File: Policy File

Figures 7C, 7D:
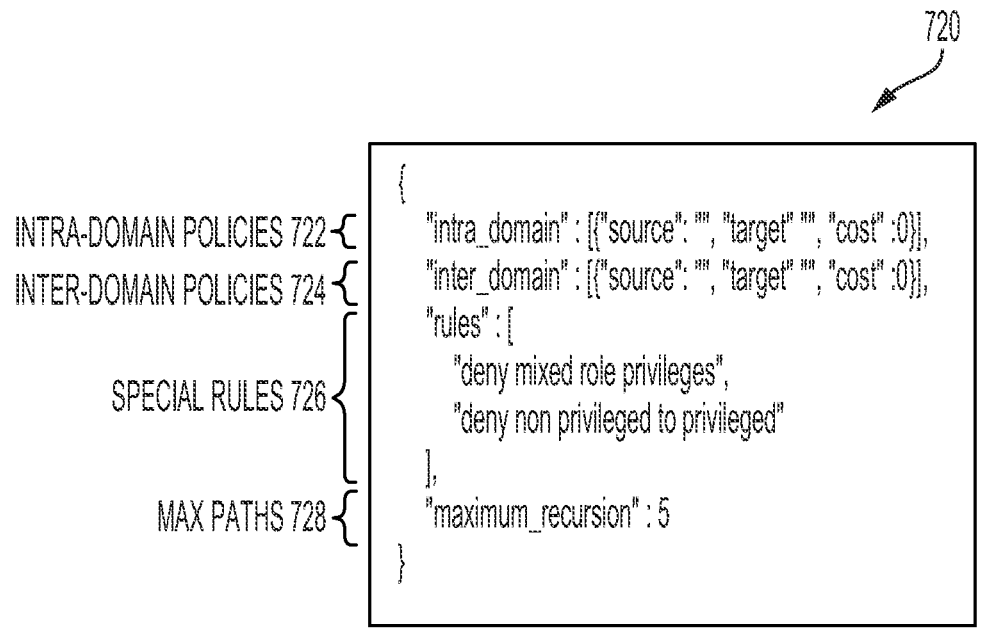
FIG. 7C depicts a portion of an exemplary policy file, in accordance with an embodiment of the present application.
FIG. 7D depicts exemplary intra- or inter-domain rules in a policy file, in accordance with an embodiment of the present application.
Figure 7F:
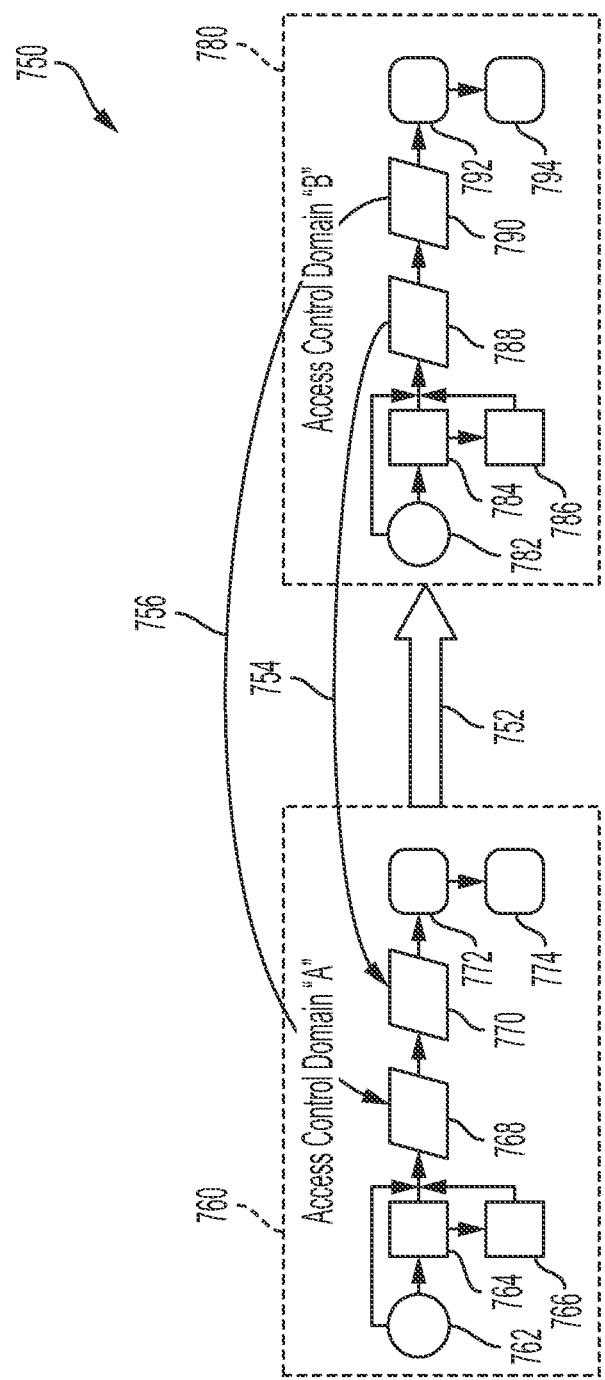
FIG. 7F depicts a diagram illustrating inter-domain trust, in accordance with an embodiment of the present application.

FIG. 7C depicts an exemplary policy file 720, in accordance with an embodiment of the present application. Policy file 720 can include four parts: intra-domain policies 722; inter-domain policies 724; special rules 726; and a max paths 728 (i.e., how long of paths to consider or a maximum recursion). The cost of each edge can be summed for a total path cost. The system (e.g., the solver) can prefer to use lower cost solutions. Each role membership and capability assignment can be considered an edge in a path.

The intra-domain and inter-domain sections (722 and 724) can specify the cost of a relationship. The types of relationships can be represented as allowed edges, including, e.g.: user to role; user to capability; role to role; role to capability; capability to capability (this can occur in resource containment and permission implications); and capability to resource. This can be viewed as specifying the cost of an edge in a graph. The system can use two special tokens: "_ASSIGNED_"; and "_ANY_". The ANY token will match any node type. The ASSIGNED token indicates to the system that if the relationship was explicitly assigned via the capability assignment and membership rules, the system will apply this cost.

If the cost is null, the system will prohibit the relationship. The user configuring the RBAC schemas is responsible for ensuring that all feasible combinations are specified. Note that a user in this model can only be a source and a resource can only be a sink. A capability can only link to another capability or a resource. Examples of the capability to resource relationship are provided below in relation to FIG. 7D.

FIG. 7D depicts exemplary intra- or inter-domain rules 740 in a policy file, in accordance with an embodiment of the present application. The intra-domain rules can be used when the source and target are in the same security domain. The inter-domain rules can be used when the source and target are in different domains.

The "rules" section (726) in FIG. 7C can enumerate two fixed rules that the user may turn on or off. The "deny mixed role privilege" rule allows the system to prohibit role-in-role membership if one role is privileged, and the other is not. The "deny non privileged to privileged" applies to any principal types and allows the system to prohibit any edge from a non-privileged object to a privileged object.

The "maximum_recursion" specification (728) in FIG. 7C is how long—in hops—paths may be. For a single domain with only a few computers, a path length of six can generally suffice. This allows three group nesting relations plus a capability assignment plus the link to the resource plus one level of permission implication, or other similar combinations.

FIG. 7E depicts exemplary capability assignments 745 from a specification file, in accordance with an embodiment of the present application. As described herein, capability assignments make up the core of the specification file (e.g., as shown above in relation to FIG. 7B). The capability assignments drive all the hard constraints on the system. For every granted capability, the system will ensure that some path exists from the principal to the resource capability. This path may occur through role memberships and/or resource containment. Any capability which is not implicitly allowed from the capability assignment and membership elements will be a hard deny.

Multiple entries may exist for a principal, and these multiple entries will be merged. The name of the principal must match a user or role name. A permission must match one of the permission names. The resource must match the name of a resource.

In some embodiments, a user can specify capability dependencies. For example, a user may wish to specify that "login" on a computer requires that an anonymous user has "read" to a specific registry key on that computer. In other embodiments, a permission dependency can be expressed by the user as a set of granted permissions—all other permissions are denied.

The described system (e.g., the SCIBORG RBAC Model) can also support inter-domain trust, as shown below in FIG. 7F. FIG. 7F depicts a diagram 750 illustrating inter-domain trust, in accordance with an embodiment of the present application. Diagram 750 can include an access control domain "A" 760 and an access control domain "B" 780. Domain A 760 can include: a user 762; roles or groups 764 and 766; permissions 768 and 770; and resources 772 and 774. Domain B 780 can include: a user 782; roles or groups 784 and 786; permissions 788 and 790; and resources 792 and 794.

If domain A 760 trusts domain B 780 (indicated by a trust relationship arrow 752), then users and roles (e.g., user 782 and roles 784 and 786) from domain B 780 may be used in domain A 760. As a result, a user or role from domain B 780 could be placed in a role in domain A 760. Furthermore, a user or role (e.g., user 782 and roles 784 and 786) from domain B 780 may be assigned a capability directly in domain A 760. This can be indicated by permission inheritance arrows 754 and 756, respectively, from permission 788 in domain B 780 to permission 770 in domain A 760 and from permission 790 in domain B 780 to permission 768 in domain A 760.

Inter-domain trust may occur in Windows Active Directory (AD) setups. Each computer, whether in a domain or not, can have its own local users and groups. This may be the lowest level of a security domain. A computer that is in an AD domain can trust that AD domain. AD domains can commonly form trees, which are represented by trust relationships.

The described aspects of the system can support multiple trust relationships, but the trust relationships are not transitive. If C trusts B and B trusts A, then users/groups from A may be used in B and users/groups from B may be used in C. However, this does not imply that a user from A could be used directly in C. In some embodiments, trust relationships may be symmetric, such as A trusts B and B trusts A.

Implementation Including Three Rules Sections

The implementation section can include the following three rules sections: (1) Operational Requirements; (2) Access Control Entry (ACE) Requirements; and (3) Path Requirements. The Operational Requirements must always be true. The ACE Requirements can correspond to the description of the assigned and convolved matrices provided above and in relation to FIGS. 5A and 5B. The Path Requirements can correspond to the first hop, transit hop(s), and last-hop paths as described above in relation to FIG. 6.

The implementation can use Z3 bit vectors to encode memberships. Memberships may be created for users in groups and for groups in groups. Memberships may also be used for permission assignments (S,P) in some discretionary access control lists (DACLs).

The following sections use a dotted accessor notation, not a matrix notation. For example, what was previously represented as $CONV_P [(X=S,P), LA]=1$ is denoted below as: (member X P.convolved.LA). Furthermore, a zero entry is denoted as: (not . . . ).

Operational Requirements

1. No cycles. If M is a member of R, then there does not exist a path from R to M:
   (assert (=>(path A) (not (or (path B) (path C) . . . )))), where A from M to R and B, C, . . . from R to M.
2. Never a member of self: For every role R, R is not a member of R:
   (assert (not (member R R)))
3. Soft deny all group memberships:
   Deny every (user, group) pair with a weight based on operator preference:
   (assert-soft (not (member S T)):weight W).
   For every user-group and group-group edge in a domain graph, add a soft constraint that (not (member s t_exp)) with a weight of 1. These set a baseline that all expanded group bits are set to 0. T_exp is the expanded membership of T considering all nested group memberships:
   (assert-soft (not (member S T_exp)):weight 1).
4. Add members: For every (S,T) pair that is in the operator-defined input specification, add a requirement that S is indirectly a member of T. That is, there can be nodes between S and T:
   (assert (OR (path a) (path b) . . . (path k))), where a, b, . . . are paths from S to T.
5. Add inheritance rules: These can define how permissions flow from a resource container to resources it contains. Assigned.{ia, id} are no longer used. It is only in the convolved values:
   (assert (AND
      (=R.convolved.ia ACE_FOO.empty)
      (=R.convolved.id ACE_FOO.empty))),
   where FOO is the resource type (e.g., RegKey).
   For every resource S that contains a resource T, set functional requirements for:
   (assert (=T.convolved.IA
      (AND (NOT S.convolved.LD)
         (OR S.convolved.LA S.convolved.IA))))
   (assert (=T.convolved.ID
      (OR S.convolved.LD
         (AND (NOT S.convolved.LA) S.convolved.ID))))

Access Control Entry Requirements

1. Assigned to convolved: For all ACE, R, LA, LD:
   (assert (=>(member ACE R.assigned.LA)
      (member ACE R.convolved.LA))
   (assert (=>(member ACE R.assigned.LD)
      (member ACE R.convolved.LD))
2. Convolve assigned with groups: For each principal M and group G, if M is a member of G, then add G's expanded LA, LD to M's for every resource R0 . . . Rn. These equations are only generated if there is a path from M to G and from G to R.
   (assert (=>
      (member M G)
      (=>(member (G, P0) R0.convolved.LA)
         (member (M, P0) R0.convolved.LA))
      . . .
      (=>(member (G, Pk) R0.convolved.LA)
         (member (M, Pk) R0.convolved.LA))))
   . . .
   (assert (=>
      (member M G)
      (=>(member (G, P0) Rn.convolved.LA)
         (member (M, P0) Rn.convolved.LA))
      . . .
      (=>(member (G, Pk) Rn.convolved.LA)
         (member (M, Pk) Rn.convolved.LA)))).
3. Convolved to assigned: If (M,P) is in R.convolved.{LA,LD}, then it had to get there somehow.
   (assert (=>(member (M,P) R.convolved.X)
      (OR
      ; This is reverse of #1 above
      (member (M,P) R.assigned.X)
      ; These are the reverse of #2 above
      ; Only if there is a path from M to Gx and from Gx to R.
      (AND (member M G0 exp) (member (G0, P) R.assigned.X))
      . . .
      (AND (member M Gn_exp) (member (Gn, P) R.assigned.X)).
4. Expand permissions:
   For every principal M and permission P in R.effective, write an implication for all implied permissions:
   (assert (=>(member (M,P) R.effective)
      (AND (member (M,P1) R.effective)
         (member (M,P2) R.effective) . . . ))),
   where P=>{P1, P2}. For example, WRITE would expand to LIST, READ.
   Do the same for the assigned.LA and assigned.LD.

5. Add rules for DACL equation:

```
(assert
 (= R.effective (AND
    (NOT R.convolved.LD)
    (OR R.convolved.LA
       (AND R.convolved.IA
          (NOT R.convolved.ID)))))).
```

6. Assign permissions to effective rights:
For every requirement in the RBAC file for a user U to have a permission P on resource R, create a Functional Requirement that the ACE (U, P) is a member of R.effective. These can be derived from an access control graph:
(member (U,P) R.effective).
For every requirement that (M,P) is denied at R, add a Functional Requirement:
(not (member (M,P) R.effective)).
7. Soft deny resources:
For every ACE and resource, do a soft deny that the ACE is not in the resource. The weight is the domain graph's weight. This is done for all 5 ACLs.
For R.assigned, use the domain graph edge weight (these are the output variables).
For R.effective, use a weight of 1 (this is simply to try and minimize the number of assignments).
Do not add for R.expanded.
8. Any permissions not explicitly or implicitly granted (via group membership or permission implications) should be denied in R.effective:
For users only. Groups should be left floating so they can be used for the policy:
(assert (not (member (U,P) R.effective).
If a group has been used to assign capabilities in the RBAC JSON file, that group should be subject to this rule. This applies recursively to member groups of an assigned group. If the group appears in the Access Control graph, it is an assigned group.
Only "free" groups should be excluded from this rule.
9. Expanded members: If a group's expanded members has no users, it should have no effective permission. That is, a group that is only a collection of other groups without any users show has no permissions assigned:

```
(assert (=>
  (= G_exp Principals.empty)
  (not (and
     (member (G, P1) R.effective) ...
        (member (G, Pm) R.effective))))).
```

10. Deny untrusted domains:
For every role R, deny every user and role from untrusted domains:
(assert (not (member p0 R)) . . . (asset (not (member pK R))).
For every principal M from an untrusted domain, deny them in a resource's ACL. The preferred method is to use ACLs sized to only the permissible members, as having all possible (M,P) pairs in every ACL may be unnecessary:
(assert (not (member (M, P0) R.effective))) . . .
(assert (not (member (M, Pk) R.effective))).

Path Requirements
The prior sections describe back-tracking rules that go from effective rights to assigned rights. The system can also have an assignment of user/group M permission P to a resource (or a deny of the same). The section entitled "How to Model a Group Membership" along with the below section describes the ways in which a user can obtain those rights through group memberships.

The domain graph can be a weighted directed simple graph and can contain, include, or indicate all the allowable paths from users to resources. These paths can conform to the domain trust and operator policies. While the system may use the domain graph to generate these paths, instead the system uses a cache of all paths used by the Operational Requirements, Inheritance, and Access Control Entry Requirements. This can eliminate undue path expansion: if a path was not used by any of those three requirements, then it is not a valid choice for the Reasoner.

For every assignment (U,P), where U is specifically a User not a group, to a resource R, the system can write predicates that state that if U is a member of the expanded local allow/deny, then there must be some path from U to that resource, where the terminal user/group of the path is assigned that permission. The user/group could also be assigned a permission that implies P, where (path i) is one possible way the user U can reach R directly or via group memberships.

The paths can be tied to the expanded local allow (LA) and local deny (LD). The LA and LD require a direct assignment at that point, which means there must be a path from the user to that particular ACL.

Paths may also be used to compute the effective group memberships. Recall that each group (parameter domain.group) has an expanded membership parameter (domain.group_exp). The expanded membership parameter can take into account the transitive nesting of group memberships based on which paths are enabled.

For a (path i)=u→g0→g1→g2, write an implication that for all the effective group memberships: g2_effl=(u, g0, g1), g1_effl=(g0, u), and g0_effl=(u). These will take the following form:
(=>(path i0) (and (member u g2_eff) (member g0 g2_eff) (member g1 g2_eff)))
(=>(path i1) (and (member u g1_eff) (member g0 g1_eff)))
(=>(path i2) (and (member u g0_eff)))

1. Expand paths:
For every (path i), expand it to a first hop and the group-group tail (if it exists). U is a user object and G is a group object. (path j) is a subpath that begins at G and ends just before a resource. The paths are generated by finding paths (U,R) from a user to a resource, but the expansion is only among the principals U and G, which form group memberships. The last-hop is a separate set of assertions about permissions handled in #2 below:
(assert (=(path i) (member U G))
or
(assert (=(path i) (and (member U G) (path j)).
The same assertion can be made for the sub-path (path j), where the subpath is only group-group memberships.

2. Soft deny paths: soft deny every role subpath with the weight of the path:
(assert-soft (not (path N)):weight W).

3. Group expansion:
For every path, write a set of functional requirement implications for the effective group memberships, as above:
(assert (=(member M G_exp)
 (or
   (member M G)
   (and (member M G1) (member G1 G)))
 . . . ))).

An expanded group should never contain its unexpanded group (i.e. (not (member G G_exp))).

If a group is empty, its expanded group must be empty:
(assert (=>(=G_as_membership empty)
(=G_exp_as_membership empty))).

An expanded group must be a superset of the unexpanded group. If the group is empty, then the expansion must be empty too:
(assert (ite (=G_members empty)
(=G_exp empty)
(member G_as_membership G_exp))), where G_members is the Parameter G, not the token G.

Method for Facilitating Windows Discretionary Access Control

Figure 8:
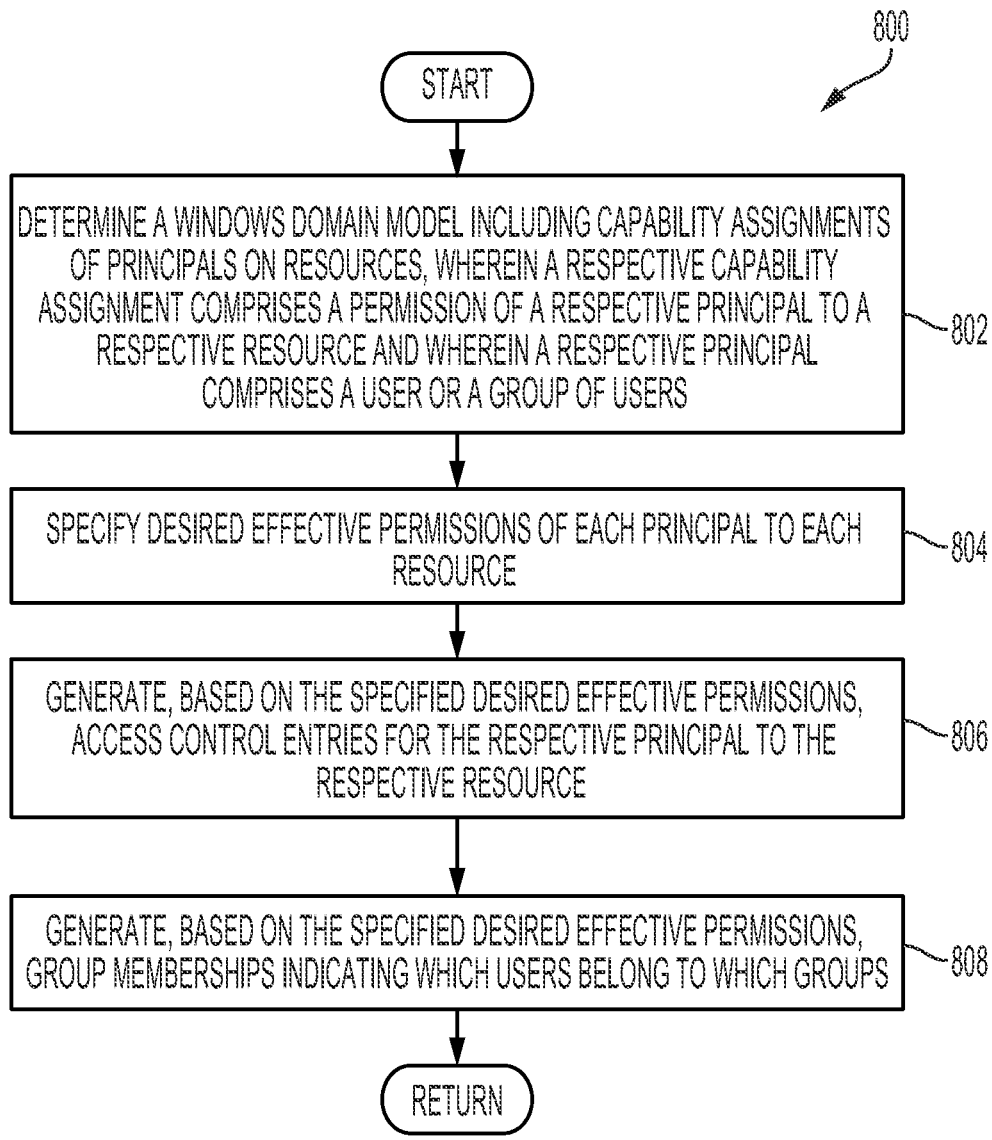
FIG. 8 presents a flow chart illustrating a method for facilitating Windows discretionary access control, in accordance with an embodiment of the present application.

FIG. 8 presents a flow chart 800 illustrating a method for facilitating Windows discretionary access control, in accordance with an embodiment of the present application. During operation, the system determines a Windows domain model including capability assignments of principals on resources, wherein a respective capability assignment comprises a permission of a respective principal to a respective resource and wherein a respective principal comprises a user or a group of users (operation 802). The system specifies desired effective permissions of each principal to each resource (operation 804). The system generates, based on the specified desired effective permissions, access control entries for the respective principal to the respective resource (operation 806). The system generates, based on the specified desired effective permissions, group memberships indicating which users belong to which groups (operation 808), and the operation returns.

Exemplary Computer and Communication System

Figure 9:
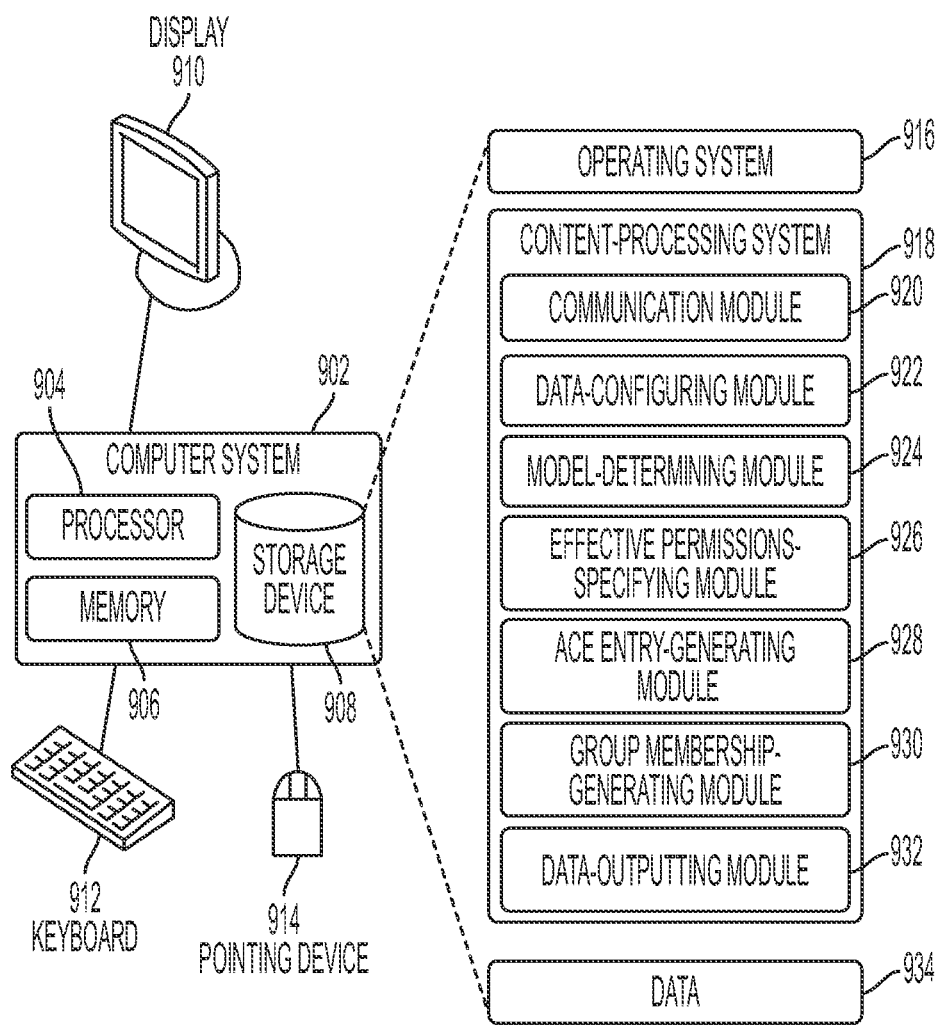
FIG. 9 illustrates an exemplary computer and communication system that facilitates Windows discretionary access control, in accordance with an embodiment of the present application.

FIG. 9 illustrates an exemplary computer and communication system 902 that facilitates Windows discretionary access control, in accordance with an embodiment of the present application. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store an operating system 916, a content-processing system 918, and data 934.

Content-processing system 918 can include instructions, which when executed by computer system 902, can cause computer system 902 to perform methods and/or processes described in this disclosure. Specifically, content-processing system 918 may include instructions for sending and/or receiving data packets to/from other network nodes across a computer network (communication module 920).

Content-processing system 918 can further include instructions for determining a Windows domain model including capability assignments of principals on resources, wherein a respective capability assignment comprises a permission of a respective principal to a respective resource and wherein a respective principal comprises a user or a group of users (model-determining module 924). Content-processing system 918 can include instructions for specifying desired effective permissions of each principal to each resource (effective permissions-specifying module 926). Content-processing system 918 can include instructions for generating, based on the specified desired effective permissions, access control entries for the respective principal to the respective resource (ACE entry-generating module 928). Content-processing system 918 can include instructions for generating, based on the specified desired effective permissions, group memberships indicating which users belong to which groups (group membership-generating module 930).

Content-processing system 918 can also include instructions for solving for the desired state of the capability assignments by reducing a number of changes to be made to the current configuration (data-outputting module 932). Content-processing system 918 can include instructions for caching enabled paths used to generate, based on the specified desired effective permissions, the access control entries for the respective principal to the respective resource, wherein the enabled paths conform to the rules indicated in the policy file (group membership-generating module 930). Content-processing system 918 can also include instructions for determining an expanded membership parameter for each group, wherein the expanded membership parameter includes transitive nesting of group memberships based on enabled paths (group membership-generating module 930).

Content-processing system 918 can additionally include instructions for: transmitting, to a python RBAC module, the scenario file for processing to obtain a multi-layer graph (data-configuring module 922); executing, by a reasoner component, a process on the multi-layer graph to obtain a recommended configuration (data-configuring module 922); and generating, by the reasoner component based on the recommended configuration, a report comprising at least one of: choices made by the reasoner component in selecting the recommended configuration, including prioritization of a first constraint over a second constraint; a description of capabilities assigned to users and resources; and a description of group memberships (data-outputting module 932).

Content-processing system 918 can additionally include instructions for determining a convolved matrix for the desired effective permissions of a first resource, wherein columns in the convolved matrix indicate capabilities as pairs of a principal and a permission and wherein rows in the convolved matrix indicate a local allow permission, a local deny permission, an inherited allow permission, and an inherited deny permission for a respective pair (ACE entry-generating module 928). Content-processing system 918 can additionally include instructions for setting entries in the convolved matrix based on at least one of: whether a respective principal is a member of a respective group; an entry in a corresponding row of an assigned permission vector indicating the local allow permission or the local deny permission for the respective group; whether the first resource is a child resource that inherits permissions from a parent resource; and an entry in a corresponding row of a convolved matrix for the parent resource indicating the local deny permission and the local allow permission and at least one of the inherited allow permission and the inherited deny permission (ACE entry-generating module 928).

Data 934 can include any data that is required as input or that is generated as output by the methods and/or processes described in this disclosure. Specifically, data 934 can store at least: a capability assignment; an indicator of a principal, group, or role; a group membership; an access control entry; a local allow permission; a local deny permission; an inherited allow permission; an inherited deny permission; an indicator of a resource; a containment of a resource; a membership relation; an allow relation; a deny relation; a permission relation; a group of user; a set of bundled principals; an indicator of a Window element or entity which uses RBAC; a JSON-formatted file; a scenario file; a specification file; a current configuration file; a policy file; a policy; a rule; a set of desired permissions; a set of effective permissions; a number of changes to be made to a current configuration; current capability assignments; current local allow and local deny permissions; a preference of a relationship between users, groups, and resources within a single domain or between multiple domains; an indicator of a domain; an inter-domain rule; an intra-domain rule; a maximum paths or maximum recursion value; an indicator of a path; a weight for an edge in a graph; an enabled path; an expanded membership parameter; a processed scenario file; a multi-layer graph; a report; a convolved matrix; an assigned matrix; a column; a row; and an entry in matrix.

Figure 10:
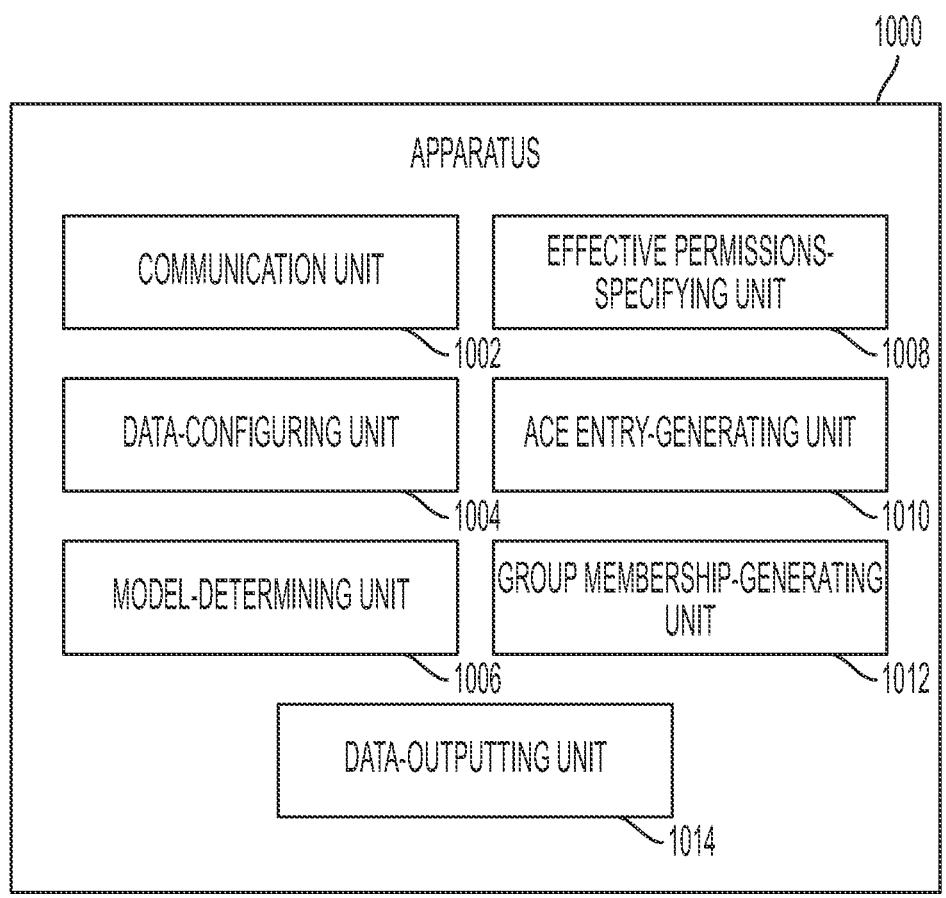
FIG. 10 illustrates an exemplary apparatus that facilitates Windows discretionary access control, in accordance with an embodiment of the present application.

FIG. 10 illustrates an exemplary apparatus 1000 that facilitates Windows discretionary access control, in accordance with an embodiment of the present application. Apparatus 1000 can comprise a plurality of units or apparatuses which may communicate with one another via a wired, wireless, quantum light, or electrical communication channel. Apparatus 1000 may be realized using one or more integrated circuits, and may include fewer or more units or apparatuses than those shown in FIG. 10. Further, apparatus 1000 may be integrated in a computer system, or realized as a separate device which is capable of communicating with other computer systems and/or devices. Specifically, apparatus 1000 can comprise units 1002-1010 which perform functions or operations similar to modules 920-932 of computer system 902 of FIG. 9, including: a communication unit 1002; a data-configuring unit 1004; a model-determining unit 1006; an effective permissions-specifying unit 1008; an ACE entry-generating unit 1010; a group membership-generating unit 1012; and a data-outputting unit 1014.

Thus, the described embodiments (e.g., the SCIBORG RBAC Model and the solver) can encode the behavior of the common RBAC access control model to facilitate secure Windows discretionary access control, and can further apply the encoded behavior to systems like Windows Active Directory, NTFS file systems, and Windows Registries. In addition, the described embodiments can be applied to other areas of Windows that use access control, e.g., files, directories, mail slots, named pipes, processes, threads, access tokens, file-mapping objects, semaphores, events, mutexes, waitable timers, window stations, desktops, registry keys, windows service objects, printer objects, network shares, private objects.

The described embodiments may also be applied to many different fields other than Windows access control. One such field is cloud security, e.g., AWS or Azure, which are both based on RBAC. The described embodiments can also apply to Mandatory Access Control and Discretionary Access Control, as all the permissions are defined as data and not hard-coded into the model. The described system can also be used to model operating system security systems, e.g., SELinux or AppArmor. A wide variety of modern software which uses access control can benefit from the described embodiments.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, the method comprising:
determining a Windows domain model including capability assignments of principals on resources,
wherein a respective capability assignment comprises a permission of a respective principal to a respective resource and wherein the respective principal comprises a user or a group of users;
specifying desired effective permissions of each principal to each resource;
generating, based on the specified desired effective permissions, access control entries for the respective principal to the respective resource; and
generating, based on the specified desired effective permissions, group memberships indicating which users belong to which groups.

2. The computer-implemented method of claim 1,
wherein the access control entries enumerate a local allow permission, a local deny permission, an inherited allow permission, and an inherited deny permission of the respective principal to the respective resource, and
wherein at least one of the following rules is applied:
the local deny permission trumps the local allow permission;
the local allow permission trumps the inherited allow permission and the inherited deny permission;
the inherited deny permission trumps the inherited allow permission; and
inheritance of permissions is prohibited.

3. The computer-implemented method of claim 1,
wherein the respective resource comprises a Windows element or entity which uses role-based access control (RBAC).

4. The computer-implemented method of claim 1,
wherein the group of users is configured by bundling principals based on at least one of:
configuring principals for the group; and
assigning and using a notional role for the principals of the group.

5. The computer-implemented method of claim 1,
wherein generating the Windows domain model and specifying the desired effective permissions is based on a scenario file, wherein the scenario file includes:
   a desired specification which defines a physical structure of the Windows domain model and a desired state of the capability assignments;
   a current configuration of the Windows domain model; and
   a policy file with rules indicating how to achieve the desired state of capability assignments.

6. The computer-implemented method of claim 5,
wherein generating the access control entries and the group memberships is further based on the policy file.

7. The computer-implemented method of claim 5, wherein generating the access control entries and the group memberships based on the specified desired effective permissions comprises:
   solving for the desired state of the capability assignments by reducing a number of changes to be made to the current configuration.

8. The computer-implemented method of claim 5,
wherein the current configuration specifies at least one of:
   current capability assignments; and
   current local allow permissions and local deny permissions.

9. The computer-implemented method of claim 5,
wherein the policy file indicates preferences of relationships between the users, groups, and resources within a single domain or between multiple domains in the Windows domain model.

10. The computer-implemented method of claim 5, wherein generating the group memberships based on the specified desired effective permissions comprises:
   caching enabled paths used to generate, based on the specified desired effective permissions, the access control entries for the respective principal to the respective resource, wherein the enabled paths conform to the rules indicated in the policy file; and
   determining an expanded membership parameter for each group, wherein the expanded membership parameter includes transitive nesting of group memberships based on enabled paths.

11. The computer-implemented method of claim 5, further comprising:
   transmitting, to a python role-based access control (RBAC) module, the scenario file for processing to obtain a multi-layer graph;
   executing, by a reasoner component, a process on the multi-layer graph to obtain a recommended configuration,
   wherein the process optimizes a functionality, security, and utility of components while minimizing an impact of vulnerabilities; and
   generating, by the reasoner component based on the recommended configuration, a report comprising at least one of:
      choices made by the reasoner component in selecting the recommended configuration, including prioritization of a first constraint over a second constraint;
      a description of capabilities assigned to users and resources; and
      a description of group memberships.

12. The computer-implemented method of claim 1, wherein generating the access control entries based on the specified desired effective permissions comprises:
   determining a convolved matrix for the desired effective permissions of a first resource,
   wherein columns in the convolved matrix indicate capabilities as pairs of a principal and a permission and
   wherein rows in the convolved matrix indicate a local allow permission, a local deny permission, an inherited allow permission, and an inherited deny permission for a respective pair; and
setting entries in the convolved matrix based on at least one of:
   whether a respective principal is a member of a respective group;
   an entry in a corresponding row of an assigned permission vector indicating the local allow permission or the local deny permission for the respective group;
   whether the first resource is a child resource that inherits permissions from a parent resource; and
   an entry in a corresponding row of a convolved matrix for the parent resource indicating the local deny permission and the local allow permission and at least one of the inherited allow permission and the inherited deny permission.

13. A computer system, comprising:
a processor; and
a storage device storing instructions that when executed by the processor cause the processor to perform a method, the method comprising:
   determining a Windows domain model including capability assignments of principals on resources,
   wherein a respective capability assignment comprises a permission of a respective principal to a respective resource and wherein the respective principal comprises a user or a group of users;
   specifying desired effective permissions of each principal to each resource;
   generating, based on the specified desired effective permissions, access control entries for the respective principal to the respective resource; and
   generating, based on the specified desired effective permissions, group memberships indicating which users belong to which groups.

14. The computer system of claim 13,
wherein the access control entries enumerate a local allow permission, a local deny permission, an inherited allow permission, and an inherited deny permission of the respective principal to the respective resource, and
wherein at least one of the following rules is applied:
   the local deny permission trumps the local allow permission;
   the local allow permission trumps the inherited allow permission and the inherited deny permission;
   the inherited deny permission trumps the inherited allow permission; and
   inheritance of permissions is prohibited.

15. The computer system of claim 13,
wherein the respective resource comprises a Windows element or entity which uses role-based access control (RBAC).

16. The computer system of claim 13,
wherein generating the Windows domain model and specifying the desired effective permissions is based on a scenario file,
wherein the scenario file includes:
   a desired specification which defines a physical structure of the Windows domain model and a desired state of the capability assignments;
   a current configuration of the Windows domain model; and
   a policy file with rules indicating how to achieve the desired state of capability assignments, and wherein generating the access control entries and the group memberships is further based on the policy file, which indicates preferences of relationships between the users, groups, and resources within a single domain or between multiple domains in the Windows domain model.

17. The computer system of claim 16, wherein generating the access control entries and the group memberships based on the specified desired effective permissions comprises:
solving for the desired state of the capability assignments by reducing a number of changes to be made to the current configuration.

18. The computer system of claim 13, wherein generating the access control entries based on the specified desired effective permissions comprises:
determining a convolved matrix for the desired effective permissions of a first resource,
wherein columns in the convolved matrix indicate capabilities as pairs of a principal and a permission and wherein rows in the convolved matrix indicate a local allow permission, a local deny permission, an inherited allow permission, and an inherited deny permission for a respective pair; and
setting entries in the convolved matrix based on at least one of:
whether a respective principal is a member of a respective group;
an entry in a corresponding row of an assigned permission vector indicating the local allow permission or the local deny permission for the respective group;
whether the first resource is a child resource that inherits permissions from a parent resource; and
an entry in a corresponding row of a convolved matrix for the parent resource indicating the local deny permission and the local allow permission and at least one of the inherited allow permission and the inherited deny permission.

19. A non-transitory computer-readable storage medium storing instructions that when executed by a computer cause the computer to perform a method, the method comprising:
determining a Windows domain model including capability assignments of principals on resources,
wherein a respective capability assignment comprises a permission of a respective principal to a respective resource and wherein the respective principal comprises a user or a group of users;
specifying desired effective permissions of each principal to each resource;
generating, based on the specified desired effective permissions, access control entries for the respective principal to the respective resource; and
generating, based on the specified desired effective permissions, group memberships indicating which users belong to which groups.

20. The non-transitory computer-readable storage medium of claim 19,
wherein generating the Windows domain model and specifying the desired effective permissions is based on a scenario file,
wherein the scenario file includes:
a desired specification which defines a physical structure of the Windows domain model and a desired state of the capability assignments;
a current configuration of the Windows domain model; and
a policy file with rules indicating how to achieve the desired state of capability assignments, and
wherein generating the access control entries and the group memberships is further based on the policy file, which indicates preferences of relationships between the users, groups, and resources within a single domain or between multiple domains in the Windows domain model.

\* \* \* \* \*